United States Patent [19]

Stackpool et al.

[11] Patent Number: 5,024,675
[45] Date of Patent: Jun. 18, 1991

[54] APPARATUS FOR FILLING AND SEALING ALKALI METAL ELECTRODE CONTAINERS FOR ALKALI METAL ENERGY CONVERSION DEVICES AND METHOD OF FILLING ALKALI METAL ELECTRODE CONTAINERS FOR ALKALI METAL ENERGY CONVERSION DEVICES

[75] Inventors: Michael Stackpool, Runcorn; David Riley, Chester, both of United Kingdom

[73] Assignee: Chloride Silent Power Limited, Runcorn, United Kingdom

[21] Appl. No.: 341,099

[22] PCT Filed: Aug. 3, 1988

[86] PCT No.: PCT/GB88/00643
§ 371 Date: Apr. 28, 1989
§ 102(e) Date: Apr. 28, 1989

[87] PCT Pub. No.: WO89/01244
PCT Pub. Date: Feb. 9, 1989

[30] Foreign Application Priority Data

Aug. 3, 1987 [GB] United Kingdom ......... 8718375
Aug. 3, 1987 [GB] United Kingdom ......... 8718376

[51] Int. Cl.$^5$ .................. H01M 4/16; B22D 35/06
[52] U.S. Cl. ............................. 29/623.1; 29/731; 222/593; 222/603

[58] Field of Search ............... 429/623.1, 730, 731; 222/590, 593, 603

[56] References Cited

U.S. PATENT DOCUMENTS 4,297,923 11/1981 Specht et al. ............... 29/730 X
4,369,570 1/1983 Madden et al. ............. 29/730
4,468,741 8/1984 Simonton .................... 29/730 X

FOREIGN PATENT DOCUMENTS

0027325 A 4/1981 European Pat. Off. .
1188576 A 9/1959 France .
2526589 A 11/1983 France .
2061598 A 5/1981 United Kingdom .

Primary Examiner—Stephen J. Kalafut
Attorney, Agent, or Firm—Finnegan, Henderson, Farabow, Garrett & Dunner

[57] ABSTRACT

The present invention discloses an apparatus with entry, filling and sealing, and exit chambers through which a carriage holding alkali metal containers may be transferred. The drive for the carriage in each chamber is cantilevered to facilitate transfer between chambers, and lateral movement of the carriage with the respect to the direction of transfer is restricted in the filling and sealing chamber. A method of filling containers with molten alkali metal is also disclosed in which the ambient gas pressure is reduced and then raised to reduce quantities of unwanted gas in the alkali metal.

19 Claims, 17 Drawing Sheets

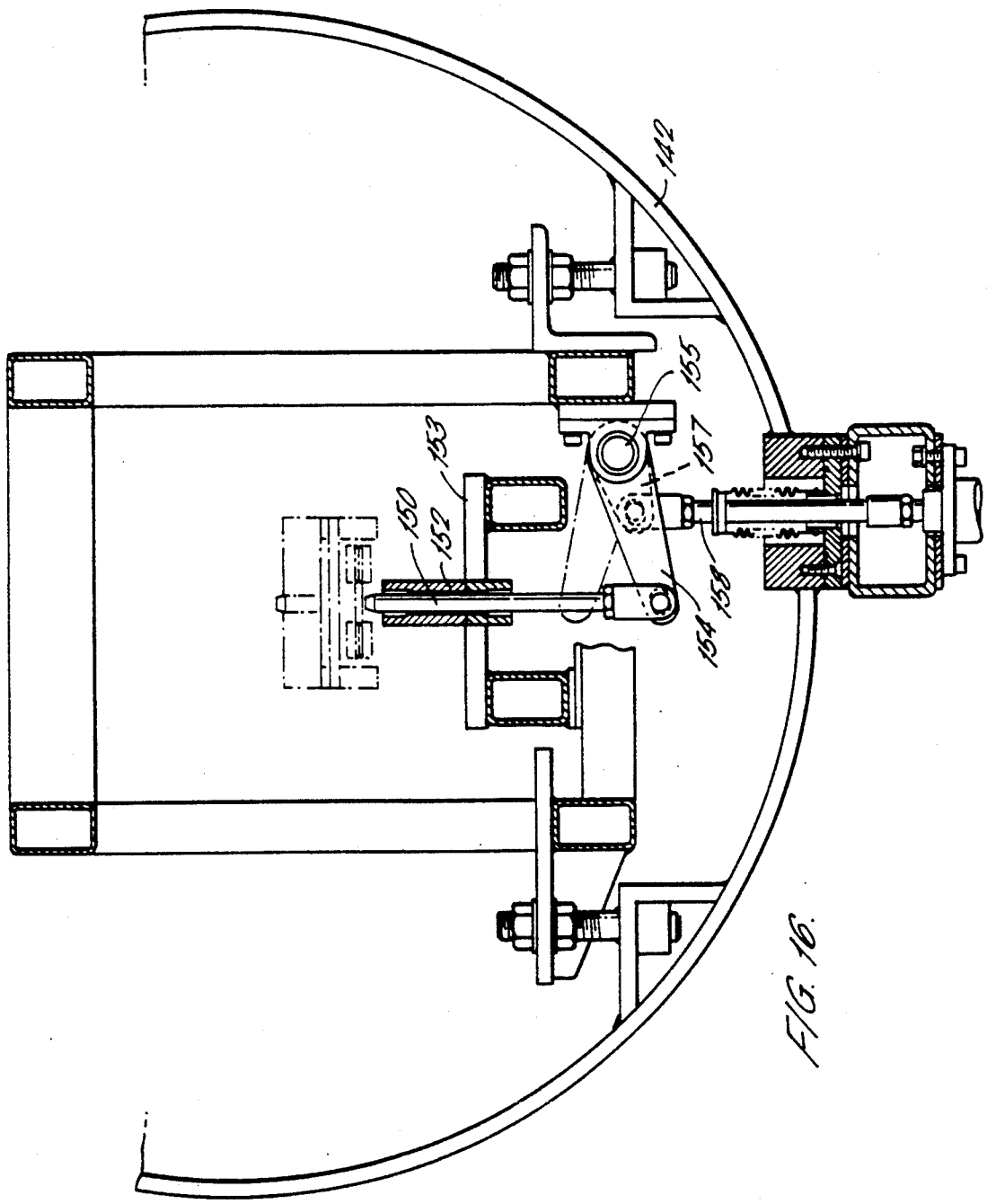

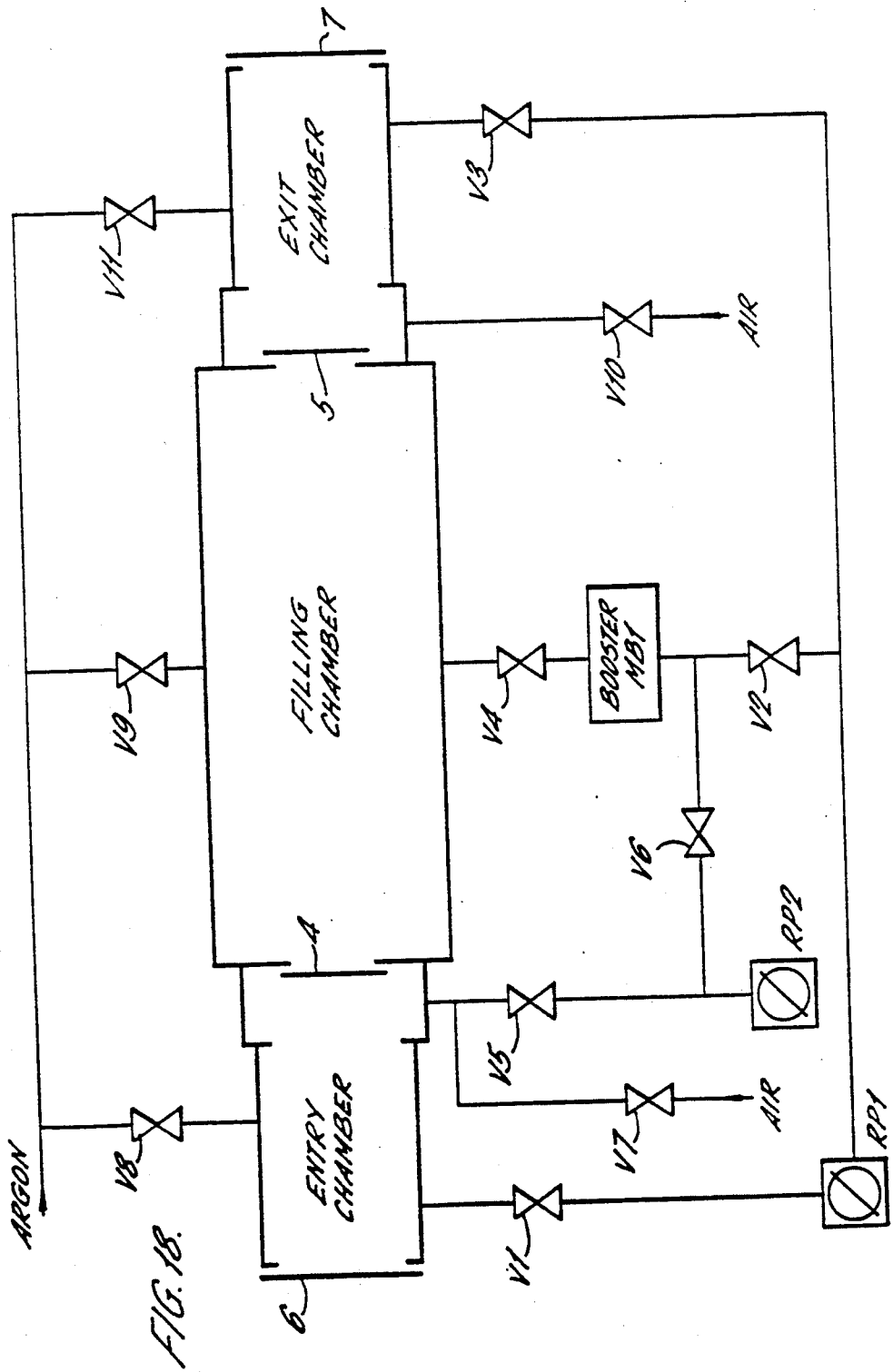

APPARATUS FOR FILLING AND SEALING ALKALI METAL ELECTRODE CONTAINERS FOR ALKALI METAL ENERGY CONVERSION DEVICES AND METHOD OF FILLING ALKALI METAL ELECTRODE CONTAINERS FOR ALKALI METAL ENERGY CONVERSION DEVICES

BACKGROUND OF THE INVENTION

The present invention is concerned with apparatus for filling and sealing alkali metal electrode containers for alkali metal energy conversion devices. This invention also relates to a method of filling alkali metal electrode containers for alkali metal energy conversion devices with alkali metal.

Such devices employ an alkali metal as one or sometimes both of the electrodes in a cell including a separator, or electrolyte, between the electrodes, formed of a solid ceramic material which is electronically insulating but conductive to cations of the alkali metal.

A particular example of such devices is the sodium sulphur cell which employs liquid sodium as the anode of the cell and liquid sulphur/sodium polysulphide material as the cathode, the two being separated by a solid electrolyte of beta alumina.

Sodium sulphur cells for experimental purposes have been made in small quantities and it is very readily possible to fill the sodium reservoir or container of the cell by carrying out the filling operation in a closed chamber filled with a suitable inert gas, the cell being sealed before removal from the chamber. The entire operation is carried out at a temperature substantially in excess of the melting point of sodium, typically 150° C.

However, such a technique is not suitable for quantity production of cells. Since the cells must be heated within the chamber prior to filling and then allowed to cool again. Furthermore, once the filled cells have cooled, the chamber must be broached to remove the cells and for the insertion of a fresh batch, whereupon the atmosphere in the chamber must be purged of any air before the next batch is heated and filled.

GB-A-2061598 describes a method and apparatus for filling sodium sulphur cells which avoids some of these difficulties. In the described arrangement, each sodium container or reservoir is provided with an open ended metal filler tube protruding from the container. Empty containers are heated progressively and presented to a sodium filling head whilst in air at atmospheric pressure. The filling head is specially designed to seal around the filler tube of the sodium container, evacuate air from within the sodium container before feeding sodium into the evacuated container. The filling head is then designed to pinch off the metal tube to seal the container before breaking the seal made with the filler tube. To facilitate this operation, it is usually necessary for the filler head to have a feed tube which can be inserted down through the filler tube of the cell into the interior of the sodium container so as to feed sodium directly into the container. The requirement for the filling head to seal to the filler tube of the sodium container also renders the design of the filling head relatively complicated as can be appreciated from the above referred specification.

SUMMARY OF THE INVENTION

According to one aspect of the present invention, apparatus for filling and sealing an alkali metal electrode container for an alkali metal energy conversion device comprises intercommunicating entry, filling and exit chambers, entry and exit doors which are closable to hermetically seal the filling chamber from the entry and exit chambers respectively, hermetically sealable entry and exit hatches to the entry and exit chambers respectively, interlock means to permit opening of said entry or exit hatch only when the respective said entry or exit door is closed, transfer means operable to transfer an electrode container to be filled and sealed successively from the entry chamber to the filling chamber and, when filled and sealed, from the filling chamber to the exit chamber, vacuum means arranged for independently controlling the atmosphere in each of the entry, filling and exit chambers to provide predetermined pressures of inert gas in said chambers, heating means arranged for independently controlling the temperatures in at least said entry and filling chambers, and filling and sealing means arranged to fill and seal said electrode container in the filling chamber, the said transfer means comprising a carriage arranged to hold at least one said electrode container, and respective drive means in each of said chambers guiding and propelling the carriage in the respective chamber, the respective drive means in adjacent communicating chambers being adapted to co-operate in supporting and propelling the carriage from one said chamber to the next through the open door between the chambers, the carriage having sufficient length in the direction of transfer to ensure full guided supporting engagement with one drive means is retained during transfer at least until the carriage engages the next drive means.

By this arrangement, the simplicity is obtained of filling the cells in an evacuated, or inert gas filled, heated chamber, so as to avoid the need for a filling head to make individual seals with the sodium containers to be filled. At the same time, the inefficiency of successively re-evacuating and heating the filling chamber is avoided by providing the intercommunicating entry and exit chambers. The entry chamber can then be used for heating and purging the cells ready for delivery to the filling chamber as soon as this has completed a previous filling and sealing operation. At the same time, the exit chamber can receive newly filled and sealed cells immediately from the filling chamber without compromising its inert atmosphere or operating temperature. The cells can then be cooled down and delivered to atmosphere from the exit chamber. The interlock means ensure that the integrity of the atmosphere in the filling chamber is maintained and the transfer means enable single electrode containers or batches of containers to be transferred between the various chambers at appropriate times in the process.

Conveniently, each drive means is adapted to provide cantilever support for the carriage during transfer, until engagement with the following drive means and after disengagement from a preceding drive means.

In an embodiment, the drive means in the filling chamber includes a length of rail for engagement on opposite sides of the rail by opposed pairs of rollers on the carriage, the end of the rails adjacent the entry door being tapered to facilitate engagement of the rail between said pairs of rollers during transfer. Preferably, the said opposed pairs of rollers are arranged to substantially restrict the movement of the carriage in a direction perpendicular to the axis of the drive means. Conveniently, the movement of the carriage is not so restricted in the entry and exit chambers, there being some such movement allowed. This arrangement facilitates engagement of the opposed pairs of rollers with the said length of rail when the carriage is transferred to the filling chamber.

Using the form of transfer means described above, the carriage may be adapted to hold said electrode container at a predetermined position on the carriage and the drive means in the filling chamber may be arranged to convey the electrode container on the carriage between respective filling and sealing stations within the filling chamber, the apparatus including inter-engagable locating means on the carriage and in the filling chamber actuatable to locate the electrode chamber accurately relative to the filling and sealing means in the filling and sealing stations respectively. Said inter-engagable locating means may comprise a locating pin mounted either on the carriage or in the filling chamber to be longitudinally movable on actuation to engage in a corresponding aperture in the filling chamber or on the carriage respectively. Either the locating pin or said aperture or both may be tapered to assist positive engagement between the pin and aperture.

Preferably there is a single said locating pin and a respective said corresponding aperture for each of the filling and sealing stations. Instead, there may be at least two locating pins mounted in the filling chamber arranged for engaging successively in a common aperture in the carriage to locate the electrode container firstly at the filling station and secondly at the sealing station.

In a preferred embodiment the apparatus may include guide means in the filling chamber for supporting and guiding the electrode container between respective filling and sealing stations in the filling chamber, and lifting means actuatable to lift the guide means and the electrode chamber supported thereon into operative engagement with the filling and sealing means.

In accordance with a further aspect of the invention, a method of filling alkali metal electrode containers, for alkali metal energy conversion devices, each container holding solid material, with an alkali metal having a large wetting angle to the solid material, comprises the steps of filling a said container with gas which is inert to the alkali metal; pumping a predetermined quantity of alkali metal into the container; reducing the pressure of said gas in the container and then raising the pressure of the gas to increase the wetting of the solid material by the alkali metal.

In particular, the container may be the sodium compartment of a sodium-sulphur cell; the alkali metal may be sodium and the solid material may be particulate aluminium typically used as a gettering agent to maintain the sodium free of impurities. The method of the present invention allows for the effective wetting of the solid material and substantially reduces the quantities of gas present in the alkali metal.

BRIEF DESCRIPTION OF THE DRAWINGS

An example of the present invention will now be described in more detail with reference to the accompanying drawings in which:

FIG. 16 is a detailed view of the filling chamber from one end illustrating, partially in cross-section, the mechanism for actuating the locating pins to locate the carriage within the filling chamber accurately relative to the filling, current collector locating and sealing heads;

FIG. 18 is a schematic diagram of the vacuum and argon supply system for the apparatus.

DETAILED DESCRIPTION

Figure 1:
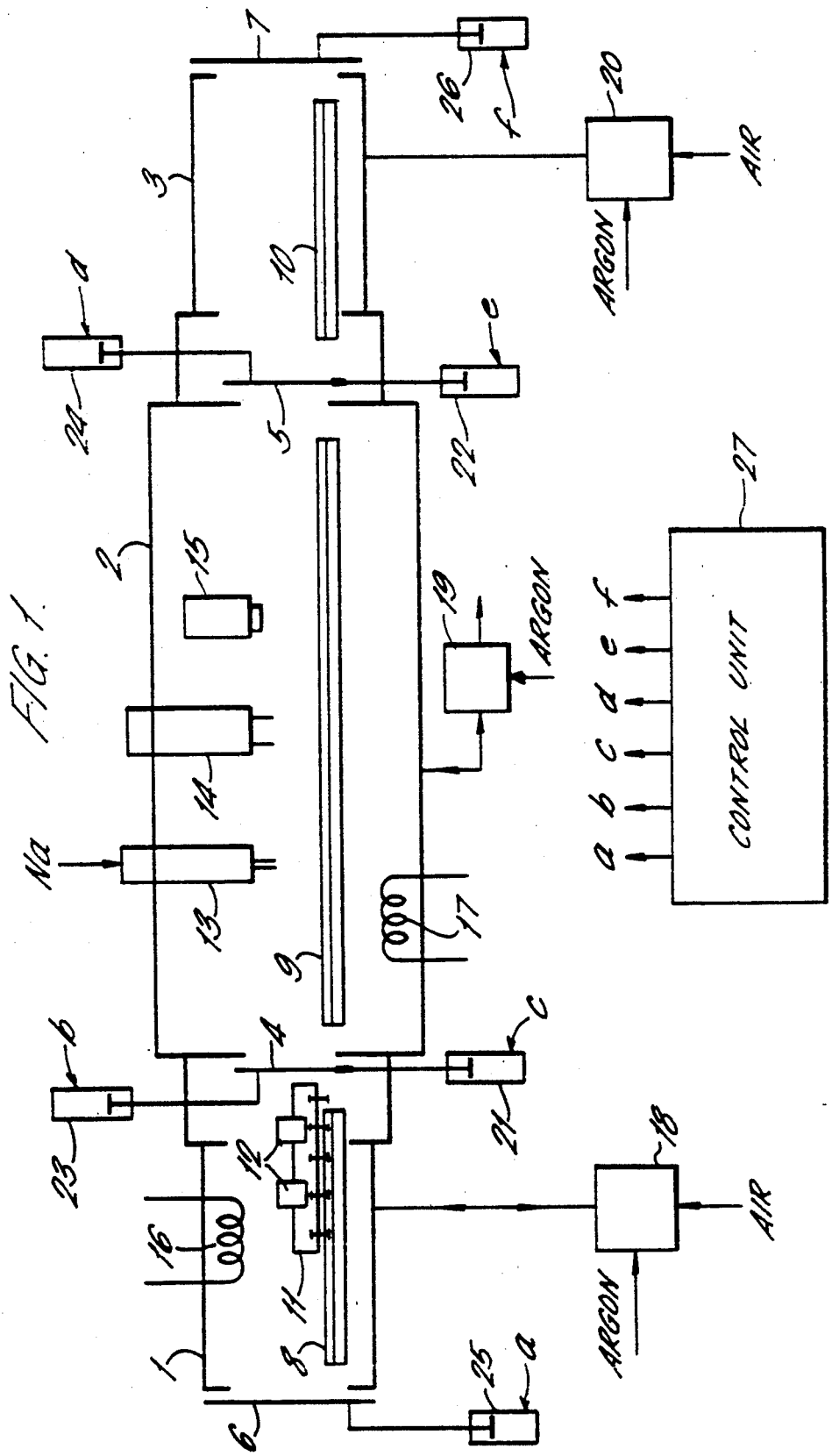
FIG. 1 is a schematic diagram of filling and sealing apparatus embodying the invention and particularly adapted for filling the sodium container for a sodium sulphur cell.

Referring to FIG. 1, the apparatus is formed of a three chamber pressure vessel. Each chamber of the vessel is generally cylindrical in shape and the three chambers are arranged coaxially with the two outer chambers being somewhat smaller in diameter and shorter than the central chamber. From left to right in FIG. 1, the chambers comprise an entry chamber 1 a filling and sealing chamber 2 and an exit chamber 3. An entry door 4 enables communication between the entry chamber 1 and the filling chamber 2, and an exit door 5 similarly enables communication between the filling chamber 2 and the exit chamber 3. The doors 4 and 5 enable the filling chamber 2 to be sealed hermetically relative to the entry chamber 1 and the exit chamber 3.

An entry hatch 6 provides access to the entry chamber 1 and similarly an exit hatch 7 provides access to the exit chamber 3. The hatches 6 and 7 also may be closed to hermetically seal the respective entry and exit chambers 1 and 3.

Within each of chambers 1, 2 and 3 there are provided respective drive means 8, 9 and 10 for guiding and propelling forward in the chamber a carriage 11 on which may be mounted a number of sodium containers 12 to be filled and sealed in the apparatus.

As will be described in further detail later herein, the drive means 8, 9 and 10 and the carriage 11 are arranged so that the carriage 11 can be propelled from the entry chamber 1 into the filling chamber 2 when the entry door 4 is open, with the carriage 11 remaining supported and propelled forward by the drive means 8 in the entry chamber 1 until it is fully engaged on the drive means 9 in the filling chamber, so that it can then be drawn by the drive means 9 from the entry chamber completely into the filling chamber. Similarly, drive means 9 in the filling chamber 2 co-operates with drive means 10 in the exit chamber for transferring the carriage from the filling chamber to the exit chamber when required. Within the filling chamber 2, drive means 9 propels the carriage 11 between a filling station 13 at which the containers 12 can be filled with sodium, and a two position sealing station for sealing the filled container. The sodium containers are presented for filling with only a small aperture in the lid of the container and the first stage of the sealing operation comprises inserting into this aperture the usual current collector for the sodium electrode. This is done at a current collector insertion station 14, and then the filled container is moved along by the drive means 9 to a welding station 15 at which the current collector is welded into the aperture in the container so as to seal the container.

Further details of the filling and sealing operations within the filling chamber 2 will be given later herein.

The entry chamber 1 and filling chamber 2 also include heaters 16 and 17 respectively, shown in the diagram schematically. These heaters may be formed as electrically powered infra-red heaters suitably positioned within each chamber to heat up and maintain the temperature of the containers throughout the filling and sealing operations. It will be appreciated that the sodium is delivered to each sodium container whilst in molten state and it is therefore essential to keep the container substantially above the melting point of sodium metal.

Vacuum means, 18, 19 and 20 are provided also for separately evacuating and controlling the atmosphere within each of the chambers 1, 2 and 3. The filling and sealing operation within the filling chamber 2 is conducted in an atmosphere of inert gas, typically argon and provision is made for purging air from the entry chamber 1 after opening the hatch 6 to supply a fresh batch of sodium containers for filling. Vacuum means 20, on the other hand, permits the pressure in the exit chamber 3 to be equalised with atmospheric prior to opening the exit hatch 7 to removed filled and sealed containers from the chamber. After resealing the chamber 3, the vacuum means 20 also purges any air from the chamber 3.

The entry and exit doors 4 and 5 of the filling chamber 2 are remotely actuated to open and close the doors, by means of pneumatic cylinders 21 and 22. The doors 4 and 5 are clamped into position when closed to provide hermetic seals, by respective mechanisms each actuating by a plurality of further pneumatic cylinders of which one only is illustrated in FIG. 1 and identified by the reference numerals 23 and 24.

The entry and exit hatches 6 and 7, once unlocked, can be physically opened and shut by hand. However they are each locked in the closed position by respective groups of pneumatic cylinders of which again only one is shown in each case indicated by reference numerals 25 and 26.

All operations of the apparatus illustrated in FIG. 1 are controlled from a central control unit indicated schematically in the drawing by the box 27. In particular, each of the pneumatic valves controlling the locking and operation of the doors 4 and 5 and hatches 6 and 7 is remotely controlled from the control unit 27. The control unit 27 is arranged to provide an interlock so that the locks on the entry hatch 6 cannot be released by means of the pneumatic cylinders 25 unless the entry door 4 to the filling chamber 2 is in the closed position (as controlled by pneumatic cylinder 21) and is clamped in place by means of the cylinders 23. Similarly, the locks on the exit hatch 7 cannot be released by means of the cylinders 26 unless the exit door 5 of the filling chamber 2 is in the closed position (as controlled by cylinder 22) and is clamped in place by means of the cylinders 24.

In this way, the integrity of the atmosphere within the filling chamber 2 is maintained irrespective of ocassional opening of the hatches 6 and 7 for delivery and withdrawal of batches of sodium containers.

Figure 2:
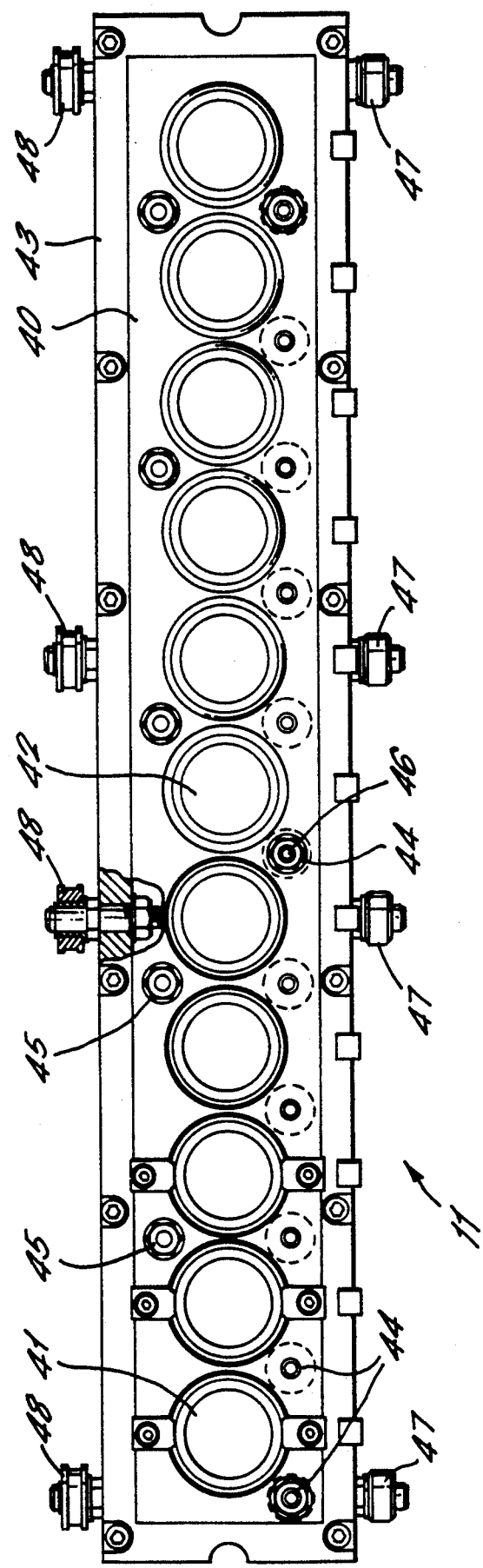
FIG. 2 is a plan view partly in cross-section of a carriage for carrying ten sodium containers for filling and sealing in the apparatus illustrated in FIG. 1.
Figure 3:
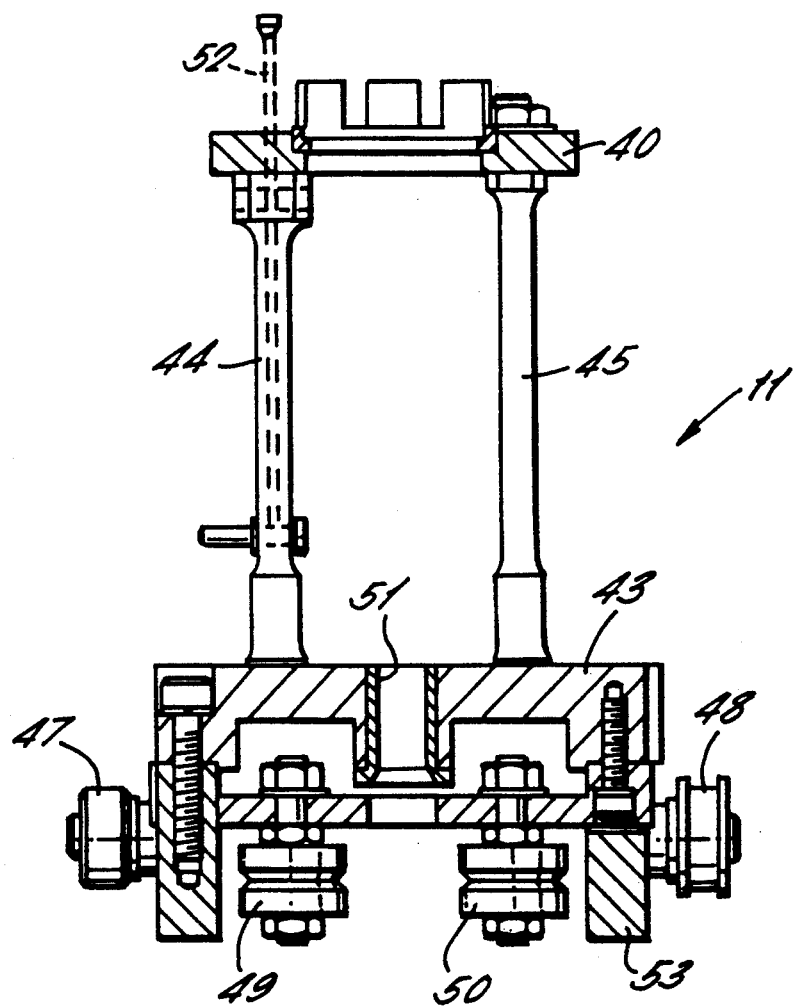
FIG. 3 is an elevational view from one end, partially in cross section, of the carriage of FIG. 2.
Figure 4:
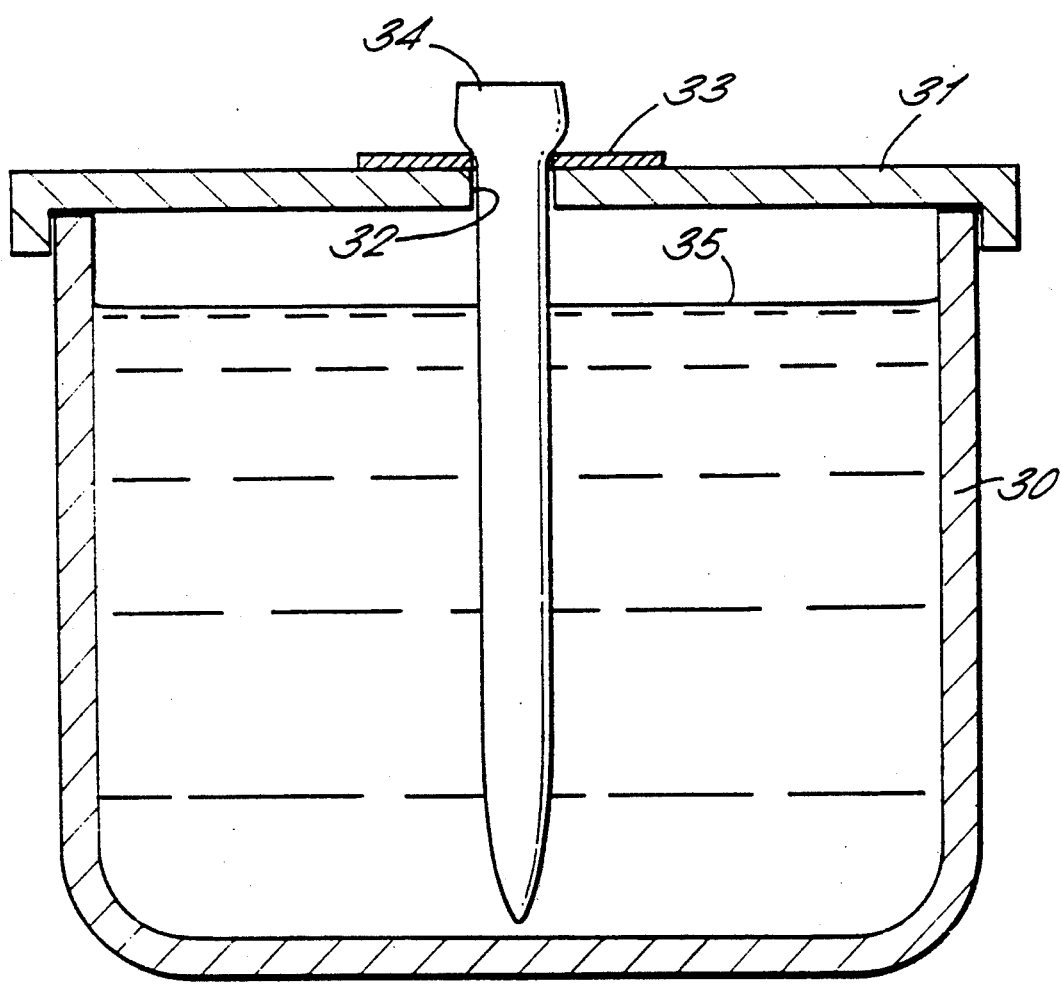
FIG. 4 is a cross-sectional view of a typical sodium container for a sodium sulphur cell and which may be filled and sealed by the apparatus illustrated in these drawings.

Referring now to FIGS. 2 and 3, the carriage 11 in which a plurality of sodium containers can be transported through the pressure vessel of FIG. 1 is illustrated in more detail. A typical form of sodium container which may be filled by the apparatus is illustrated in FIG. 4. The container comprises a cup 30 of solid electrolyte material, typically beta alumina. A lid 31 of electrically insulating alpha alumina is glazed to the open end of the cup 30. This unit, comprising the cup 30 and the glazed on lid 31 forms the container to be filled with sodium and subsequently sealed. The container is supplied to the filling apparatus with a small aperture 32 through the centre of the lid 31. A metal washer 33 is fastened and sealed to the outer surface of the lid 31, typically by thermocompression bonding, so as to surround the aperture 32 as shown in the drawing. In the filled and sealed sodium container, a pin 34, forming a current collector for the sodium electrode, is inserted through the aperture 32 so as to make contact with sodium 35 within the container and is then welded to the washer 33 so as to form an hermetic seal completely closing the sodium container.

When the container is supplied to the sodium filling apparatus for filling and sealing, the pin 34 is not inserted in the aperture 32 and the sodium metal is delivered through this aperture within the apparatus. Commonly, a quantity of dry particulate filler material may be put into the sodium container before filling with sodium. This dry particulate material may for example comprise aluminium flake or powder and is desirable within the sodium electrode compartment of the completed sodium sulphur cell, because it provides a "gettering" function purging impurities from the sodium within the cell during operation of the cell. The particulate aluminium material is put into the container before the container is delivered for sodium filling in the sodium filling apparatus.

Referring again to FIGS. 2 and 3, the illustrated carriage can hold ten sodium containers for processing as a single batch through the filling apparatus. The carriage comprises an upper plate 40 in which there are 11 circular apertures 41, as shown in FIG. 2, for receiving the cups 30 (not shown in FIG. 2) of sodium containers to be filled. The central aperture 42 of the apertures 41 is not used to receive a container for filling but is a blank position having a dummy container used for temperature monitoring during the processing through the filling apparatus.

The upper plate 40 is held spaced from a lower platform 43 by means of a plurality of stanchions 44, 45. Along one side of the row of apertures 41, stanchions 44 are provided, one for each aperture as shown in FIG. 2, though only five of the stanchions 44 include threaded portions extending through the upper plate 40 and receiving nuts 46 securing the plate 40 to the stanchion. Each of the stanchions 44, except that adjacent the central dummy aperture 42, are axially drilled from their upper ends, visible through holes in the upper plate 40, so as to receive the current collector pins 52 (FIG. 3) for the respective sodium container located in the adjacent aperture 41 of the top plate. Thus, not only are ten open sodium containers mounted in the respective apertures 41 in the top plate of the carriage, but also current collector pins for each of these containers are located immediately adjacent the respective containers.

The platform 43 of the carriage carries rollers (FIG. 3) for engaging on rails in the entry, filling and exit chambers of the filling apparatus. Rollers 47, 48, rotating about horizontal axis, are provided down both sides of the platform 43 and these rollers engage between pairs of vertically opposed rails provided in the entry and exit chambers as will be described later herein. On the other hand, rollers 49, 50, rotating about vertical axis, are provided underneath the platform 43 to engage on opposite edges of an horizontally extending rail in the filling chamber 2. Three sets of horizontally opposed rollers 49, 50 are provided distributed along the length of the carriage.

Connections to the temperature sensor in the dummy container in aperture 41 are taken to a connector block which is flush mounted in a portion 53 of the platform 43 so as to present contact pads on the underside of the portion 53. Connections can be made to these pads, as will be described later, when the carriage is in any of the chambers 1, 2 or 3 of the apparatus so as to enable continuous monitoring of the temperature of the containers.

A tapered aperture 51 is provided extending upwards through the platform 43 immediately beneath each container position, i.e. each aperture 41, 42 in the upper plate 40. The aperture 51 through the platform 43 is adapted to receive a locating pin in the filling chamber 2 of the apparatus so as to locate the respective sodium container accurately relative to the filling and sealing stations in the chamber.

Figure 5:
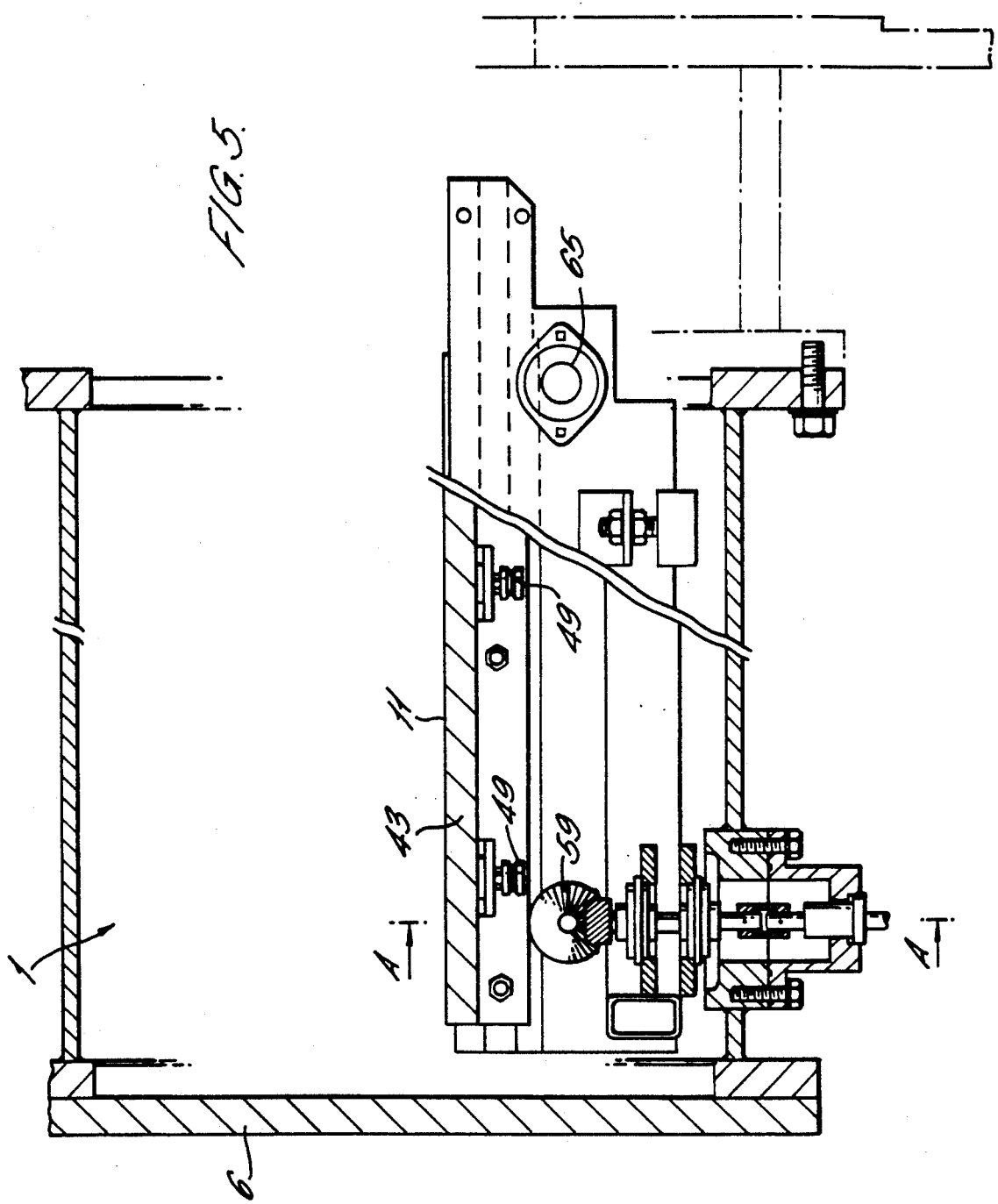
FIG. 5 is a side view in elevation of the entry chamber of the apparatus illustrated in FIG. 1, showing the drive means for guiding and propelling the carriage of FIGS. 2 and 3 within the entry chamber.

Referring to FIG. 5, the carriage of FIGS. 2 and 3 is illustrated mounted on the transfer or drive means in the entry chamber 1 of the apparatus. The carriage is indicated in FIG. 5 by the reference number 11 (corresponding to the reference used in FIG. 1), although for clarity only the platform 43 of the carriage is shown in FIG. 5.

The entry hatch 6 to the entry chamber 1 is shown to the left hand side in FIG. 5 and the carriage may be delivered from the entry chamber through the entry door (not shown) to the extreme right hand side in FIG. 5. The left hand end of the carriage is illustrated in FIG. 5 in longitudinal section so that the rollers 49 on one side of the carriage can be seen.

Figure 6:
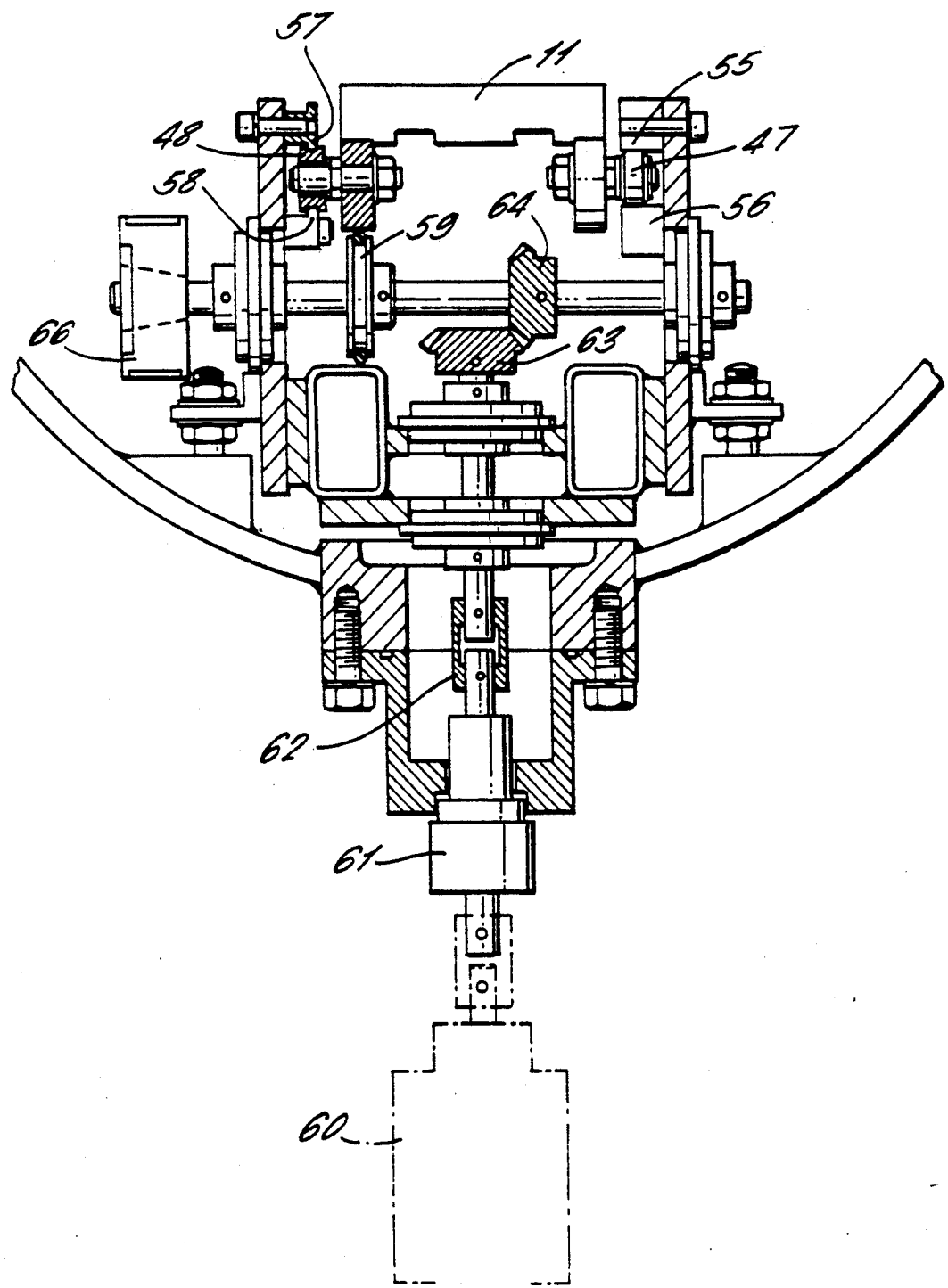
FIG. 6 is a cross-sectional view of the drive means of FIG. 5 from one end taken along the line A—A in FIG. 5.

The manner in which the carriage 11 is mounted and guided within the entry chamber 1 is better illustrated in FIG. 6 which is a cross-sectional view taken along line A—A of FIG. 5. It can be seen from FIG. 6 that the carriage 11 is supported in the entry chamber by means of the laterally extending rollers 47 and 48. The rollers 49 and 50 (FIG. 3) are not employed in the entry chamber and are omitted from FIG. 6 for clarity. The rollers 47 and 48 engage between pairs of upper and lower rails 55 and 56, and 57 and 58 respectively. The rollers 48 to one side of the carriage 11 are circumferentially grooved to engage around rails 57 and 58 to provide lateral support for the carriage 11. It will be appreciated that the spacing between the vertically opposed pairs of rails 55, 56 and 57, 58 is such as to enable the respective rollers 47, 48 to rotate when engaging either the upper or the lower rail. Thus there is a small amount of play to ensure that individual rollers do not engage both upper and lower rails simultaneously.

The carriage 11 is driven along the rails 55 to 58 by friction drive from a drive wheel 59. The drive wheel 59 is driven from an electric motor (not shown in FIG. 6) via a drive train comprising a clutch and brake assembly 60, rotary vacuum seal 61, flexible drive coupling 62 and miter gears 63 and 64.

A further friction drive wheel corresponding to wheel 59 is provided towards the other end of the rails 55 to 58 at the position indicated by the axle bearing 65 in FIG. 5. This second drive wheel is connected by a belt drive to the axle of the first drive wheel 59. Pulley 66 of one end of the belt drive is illustrated in FIG. 6.

Position sensors are provided in entry chamber I for detecting the carriage 11 as it is first introduced into the tracks 55 to 58, to initiate forward drive once the carriage is fully engaged, and subsequently to halt the drive when the carriage is fully drawn into the chamber. With reference to Figure, when the entry hatch 6 is fully closed and locked, the vacuum means 18 is operated to purge air from the chamber and provide a required pressure of argon. At the same time the heaters 16 are energised to begin heating the carriage and sodium containers thereon up to the required temperature.

When the required temperature is reached, and the filling chamber 2 is ready to receive the carriage, the entry door 4 is opened and transfer of the carriage from the entry chamber 1 to the filling chamber 2 can take place.

Figure 7:
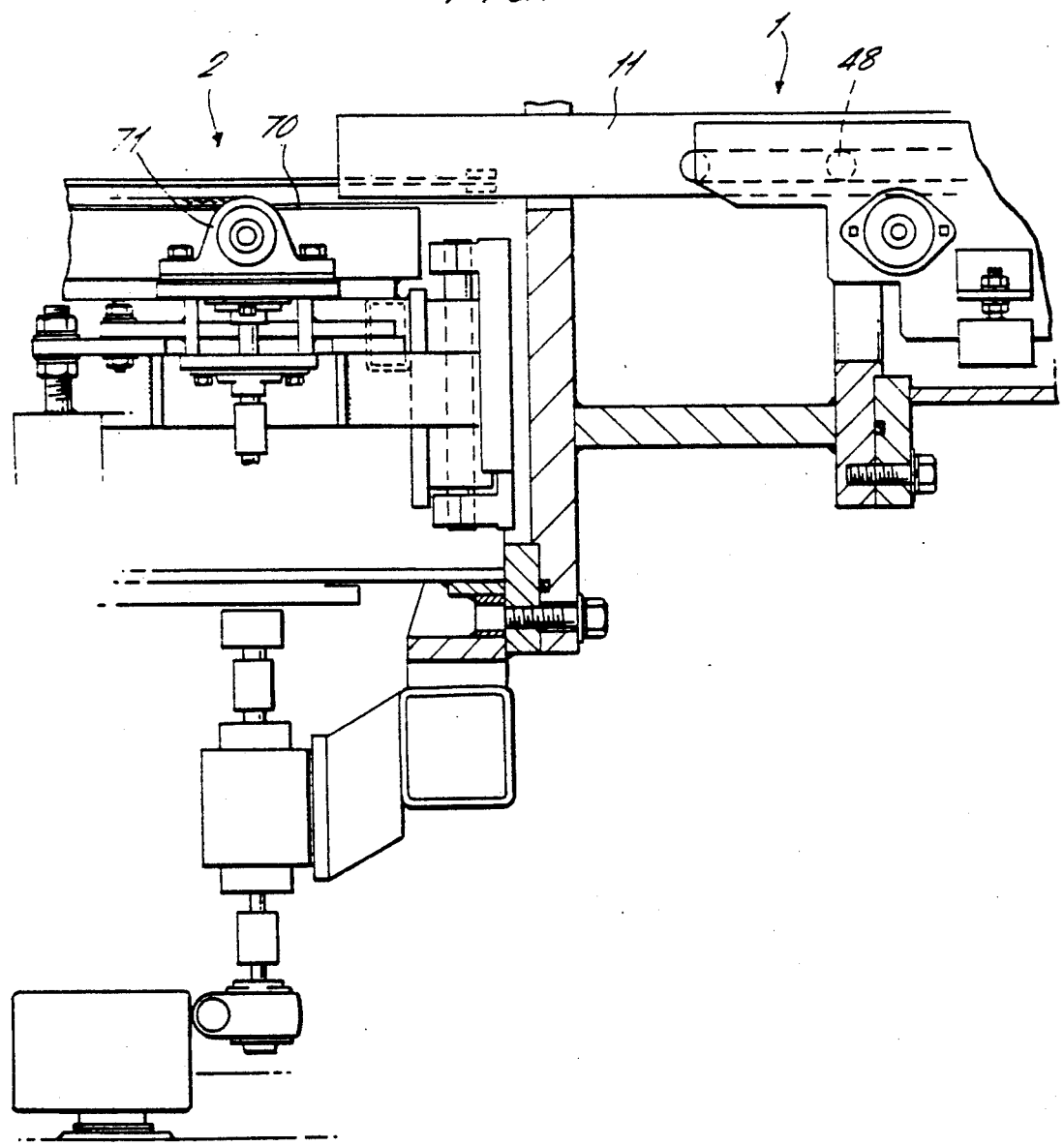
FIG. 7 is a side view in elevation illustrating the transfer of a carriage from the drive means of the entry chamber to the drive means in the filling chamber.
Figure 8:
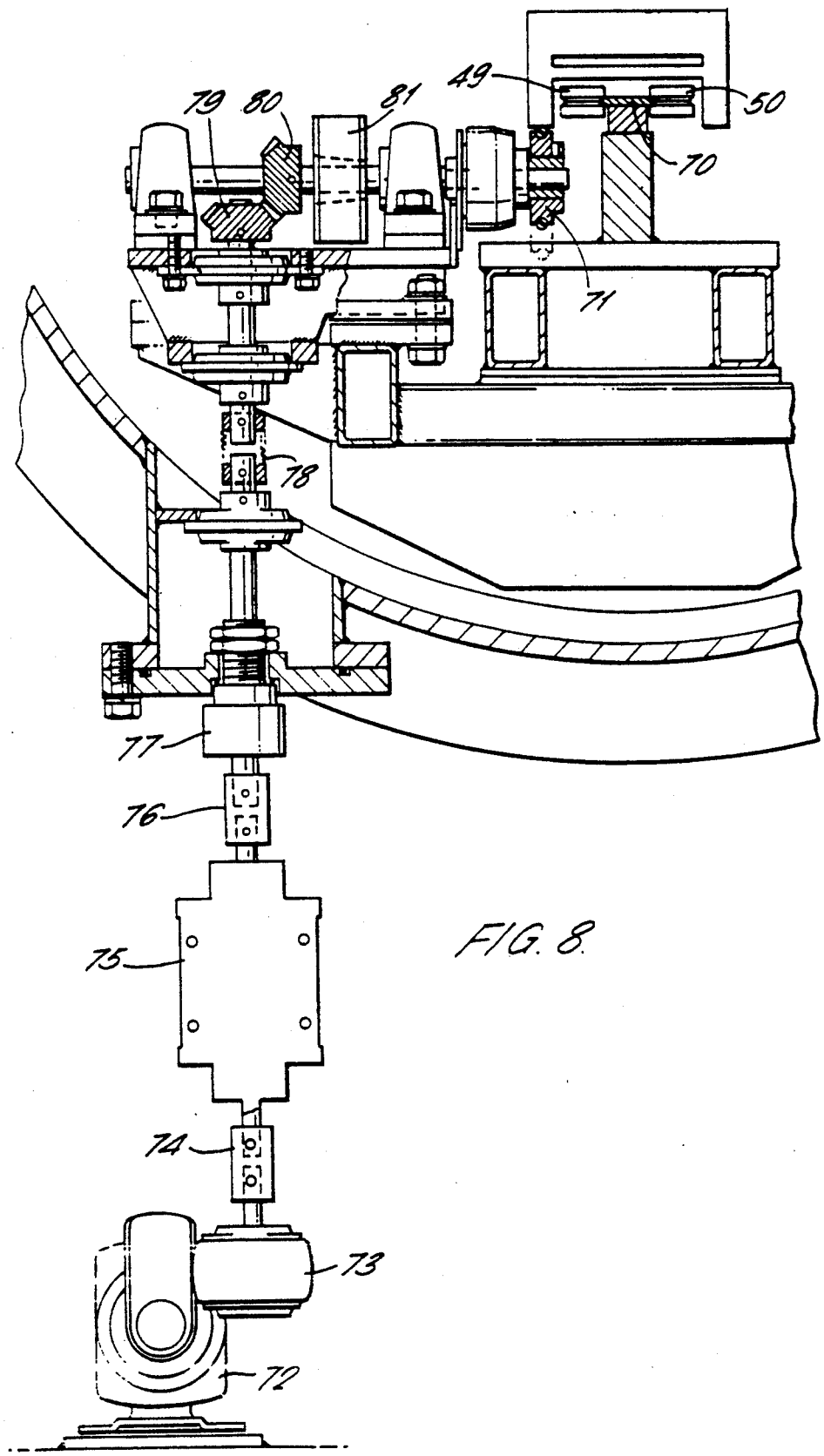
FIG. 8 is an elevational view from one end, partially in cross-section, of the drive means in the filling chamber.

FIGS. 7 and 8 illustrate the drive means within the filling chamber 2 and FIG. 7 in particular is a cross-sectional view showing carriage 11 being transferred from the entry chamber 1 to engage in the drive means 9 of the filling chamber 2. In FIG. 7, the entry chamber is shown on the right hand side and the filling chamber 2 on the left hand side.

In transferring the carriage through the door, the carriage is driven forward by the drive means in the entry chamber so as to extend through the door from the drive means, still supported cantilever fashion by at least two sets of rollers 47, 48, (only rollers 48 being visible in FIG. 7) until rollers 49, 50 of the carriage engage on opposite side of an horizontally extending rail 70 in the filling chamber 2. The rail 70 can be seen in cross-section in FIG. 8 and has bevelled edges engaging in the grooves in rollers 49 and 50 to provide both lateral and vertical guided support of the carriage.

In the transfer of the carriage from chamber 1 to chamber 2, drive of the carriage from chamber 1 is continued until the carriage has engaged a first friction drive wheel 71 of the drive mechanism within the filling chamber. Further, the rail 70 in chamber 2 and tracks 55 to 58 in chamber 1 extend close enough to each other so that the carriage is fully supported cantilever fashion while being driven forward from chamber 1 to engage the rollers 49, 50 on rail 70, and subsequently is supported by at least one pair of rollers 47, 48 in chamber 1 until a second set of rollers 49, 50 have engaged rail 70 in chamber 2, whereupon the carriage is supported cantilever fashion from the rail 70 as it is drawn fully into chamber 2.

Sensors detect that the carriage has progressed far enough into chamber 2 to engage the first friction drive wheel 71 to operate the drive to continue drawing the carriage into the chamber.

As seen in FIG. 8, the drive in chamber 2 derives from an electric motor 72 via gear box 73, flexible coupling 74, clutch and brake unit 75, a second flexible coupling 76, a rotary vacuum seal 77, a further flexible coupling 78, and miter gears 79, 80.

Sufficient additional friction drive wheels corresponding to wheel 71 are provided along the length of the rail 70 in chamber 2 to ensure that the carriage is engaged by at least one drive wheel throughout its journey through the chamber. The additional friction drive wheels are driven by belt drives via pulleys corresponding to pulley 81 in FIG. 8.

Figure 9:
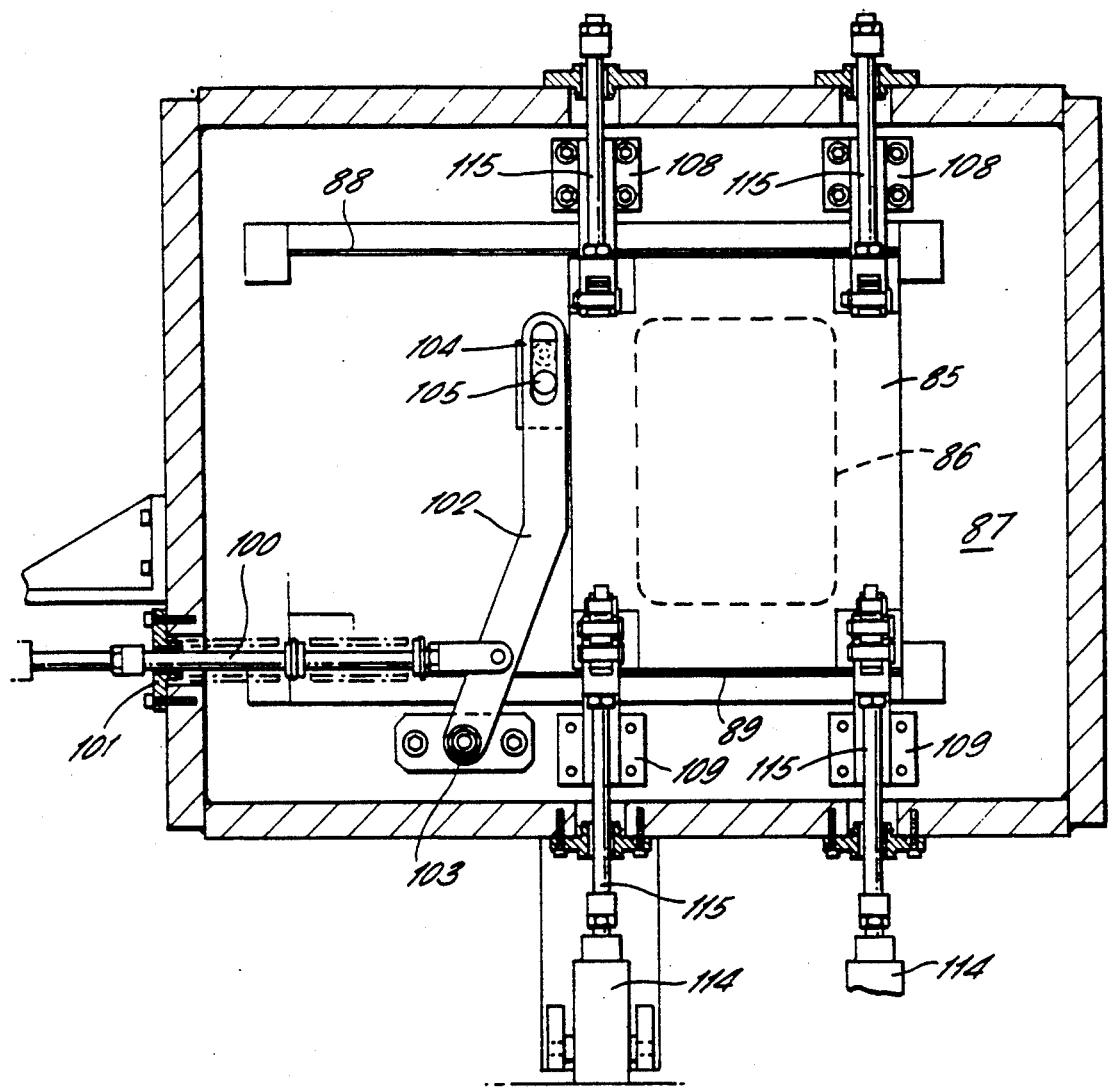
FIG. 9 is a sectional view in elevation through the entry chamber providing a view of the entry door to the filling chamber.

The entry and exit doors 4 and 5 to the chamber 2 will now be described in more detail with reference to FIGS. 9 and 10. In each case the door is formed of a closure plate 85 which, when closed, covers an aperture 86 through the bulkhead 87 between the filling chamber 2 and the respective outer chamber.

The closure plate 85 is mounted for sliding movement parallel to the plane of the aperture 86 between upper and lower rails 88 and 89 which are fixed to the bulkhead 87. The closure member 85 is mounted on these rails 88 and 89 by means of rollers 90, 91 mounted in the closure plate 85. The rollers 90, 91 are mounted so as to be axially slidable along horizontally extending axles 92, 93 which are perpendicular to the plane of the closure 85. Thus, the closure 85 has some limited movement transverse to its plane and the plane of the aperture 86, this transverse motion corresponding to sliding of the rollers 90, 91 along the axles 92, 93. Springs 94, 95 are fitted in the closure member 85 to urge the rollers 90, 91 away from the outer face 96 of the closure 85, thereby having the effect of urging the closure member 85 itself away from its seating 97 around the aperture 86.

A resilient ring seal 98 is located in a circumferential groove in the closure 85 so as to provide an hermetic seal between the closure and the seating 97 when the closure 85 is depressed against the biassing of the springs 94, 95 against the seating. However, when not depressed against the seating, the springs 94, 95 assist in moving the closure member transversely away from the seating 97, relieving the seal 98 so that the closure 85 can then be slid open.

The sliding motion is given to the closure member 85 by a pneumatic cylinder mounted outside the pressure vessel and operating on a piston rod 100 extending through a bellows seal 101. The piston rod 100 acts on a lever 102 which is pivoted at a lower end about pivot axis 103. An upper end of the lever 102 has a slot 104 which engages a stud 105 fixed to the closure 85. Thus, operation of the pneumatic cylinder to draw the piston rod 100 axially out of the pressure chamber through the seal 101, pivots the lever 102 and slides the closure 85 to open the door.

When the door is in the closed position, it must, as mentioned above, be depressed, against the biassing of springs 94, 95 firmly against the seating 97 to compress the resilient ring seal 98. This depression of the closure member 85 is provided by a set of four toggle levers 106, 107. Each lever 106, 107 is pivoted centrally from a bracket 108, 109 fixed to the bulkhead 87. The levers 106, 107 pivot about axis which are parallel to the plane of the closure 85 and have cam following rollers 110, 111 at the ends of the levers adjacent the closure 85. These rollers 110, 111 engage cam surfaces or ramps 112, 113 fixed to the closure 85, so that pivoting of the levers 106, 107 to move the rollers 110, 111 outwards relative to the centre of the pressure vessel, causes the rollers to ride up the ramps 112, 113 depressing the closure 85 towards the seating 97.

The toggle levers 106, 107 are actuated by means of respective pneumatic cylinders 114 acting through piston rods 115, journalled to the ends of the levers 106, 107 opposite to the rollers 110, 111. For clarity, only the cylinders 114 operating the lower toggle levers 107 are shown in the drawings.

Figure 10:
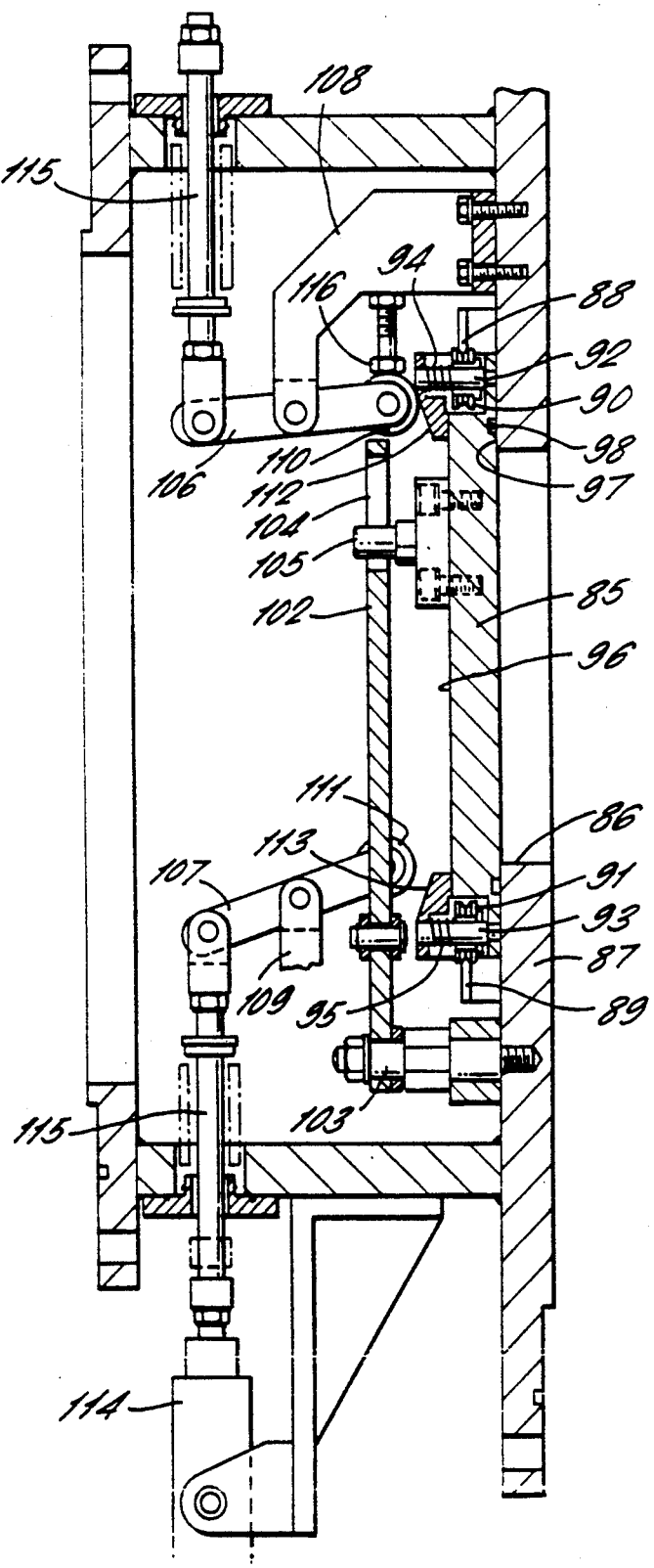
FIG. 10 is a cross-sectional view of the entry door of FIG. 9 from one side.

In FIG. 10, the lower toggle lever 107 is shown in the released position whilst the upper toggle lever 106 is shown in the clamped position depressing the closure 85 against the seating 97. In practice all the toggle levers will be operated simultaneously either to clamp the closure 85 or to release it.

It will also be observed in FIG. 10 that the geometry of the toggle levers 106, 107 and ramps 112, 113 permit the toggle levers to be pivoted when clamping the closure member 85 slightly past the point of maximum depression of the closure 85 so as to provide a toggle action. The levers 106, 107 abut stops 116 when pivoted to the fully clamped position and the geometry is such that outward pressure on the closure 85 tends to push the toggle levers 106, 107 against the stops 116. Thus, the clamping effect can be released only by applying positive effort to retract the piston rods 115 from the clamped position.

Figure 11:
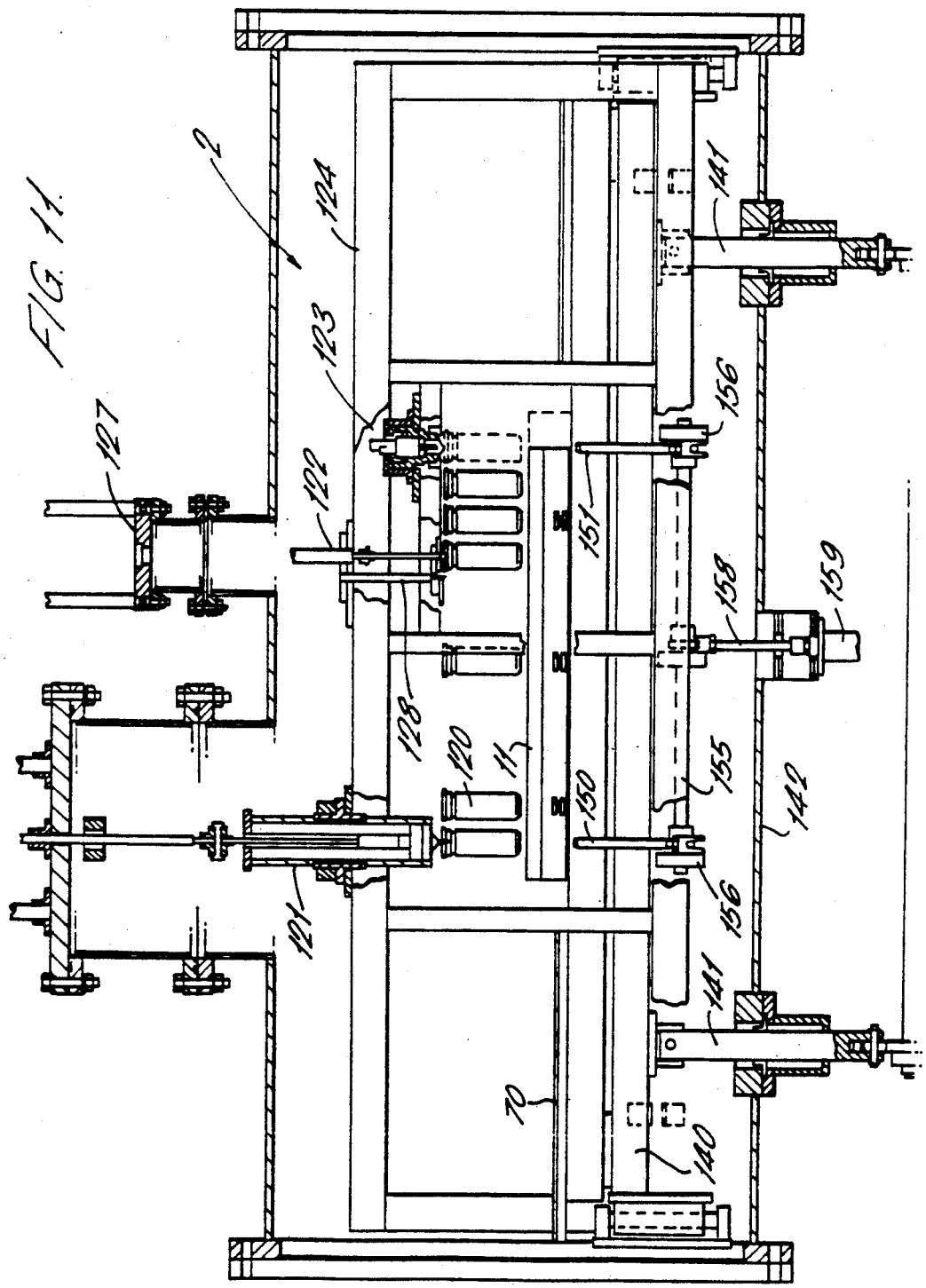
FIG. 11 is a view in elevation from one side of the filling chamber illustrating in particular the filling head and the sealing station within the chamber.

FIG. 11 is a cross-sectional view of the filling chamber 2, showing the carriage 11 (platform 43 only shown for clarity) mounted and guided on the rail 70. A total of eleven sodium containers 120 (including the dummy container) are illustrated schematically as they would be supported on the carriage 11.

The filling chamber 2 includes a filling station including a filling head 121 arranged for feeding accurately controlled quantities of molten sodium into the cells 120 through the open apertures 32 (FIG. 4) in the lid of the container. In operation of the apparatus, the carriage 11 is driven along the rail 70 after entering through the entry door (to the left in FIG. 11) until the first container is correctly located relative to the sodium filling head 121. An initial charge of sodium is then fed into the cell before the carriage is driven on sufficiently to bring the next container into the filling location. The filling operation proceeds until all ten containers have received an initial charge. It may then be necessary for a top up of sodium to be provided to each of the containers and so the carriage is driven back again to bring the first cell back into alignment with the filling head.

When all containers have received the full charge of sodium, the carriage 11 is driven to bring the first container into location under a current collector pin insertion head indicated generally at 122 in FIG. 11. This pin insertion head 122 operates to pick up the current collector pin for the container from its position on the carriage immediately adjacent the container as described with reference to FIGS. 2 and 3. The pin is picked up from this location and inserted through the aperture 32 in the top of the container. The carriage 11 is then driven forward to bring the next container into position for pin insertion.

A little further along the filling vessel 2 there is a welding head 123. When the fourth cell on the carriage 11 is brought into position for pin insertion under the insertion head 122, this also simultaneously brings the first container into position under the welding head 123. Thus, when the pin is being inserted into the fourth sodium container, the pin already inserted in the first container is welded in place to the washer 33 (FIG. 4) to seal the container. The operation is contined until all ten containers on the carriage have been filled, had their pins inserted and subsequently welded to seal the container.

Figure 12:
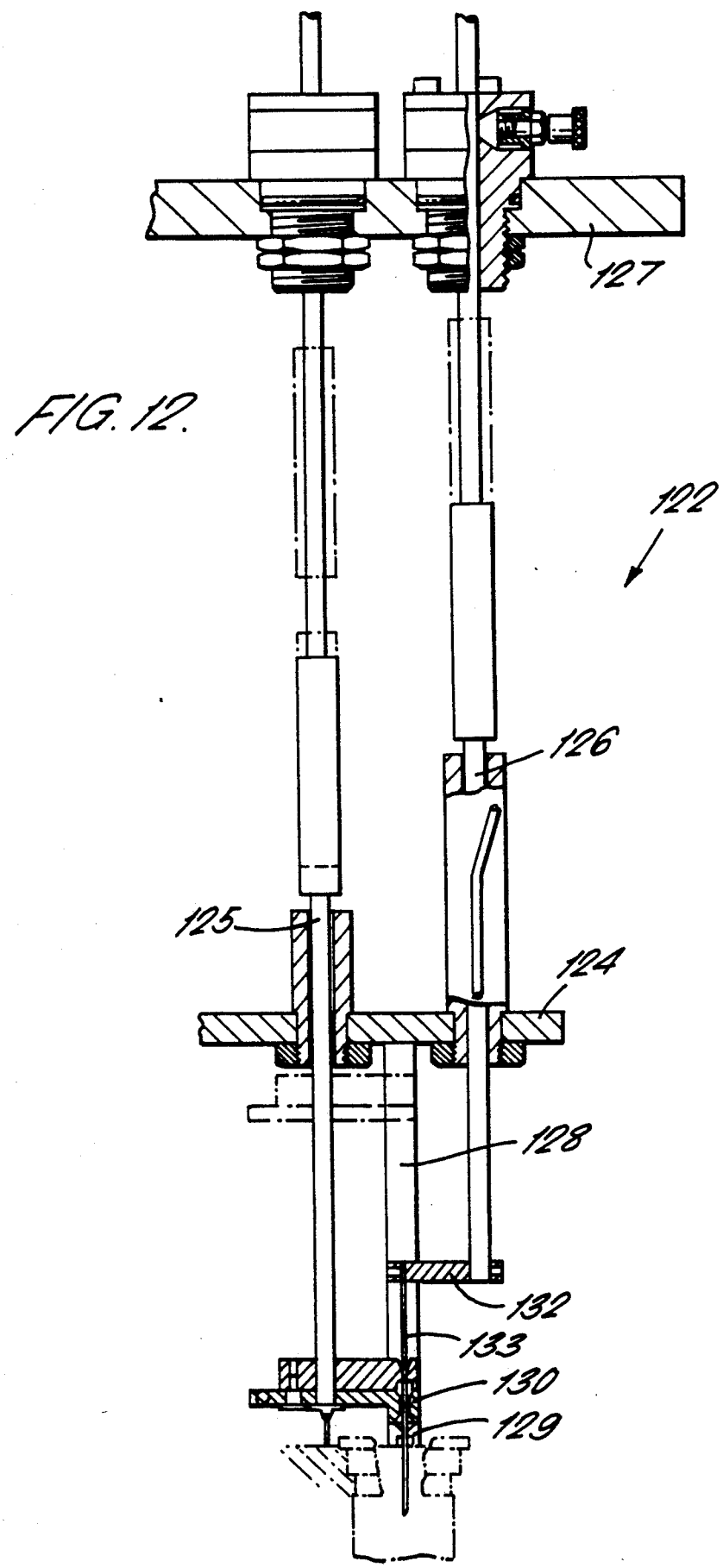
FIGS. 12 and 13 are more detailed illustrations of an assembly for placing the current collector into the aperture in the sodium container ready for sealing of the container.
Figure 13:
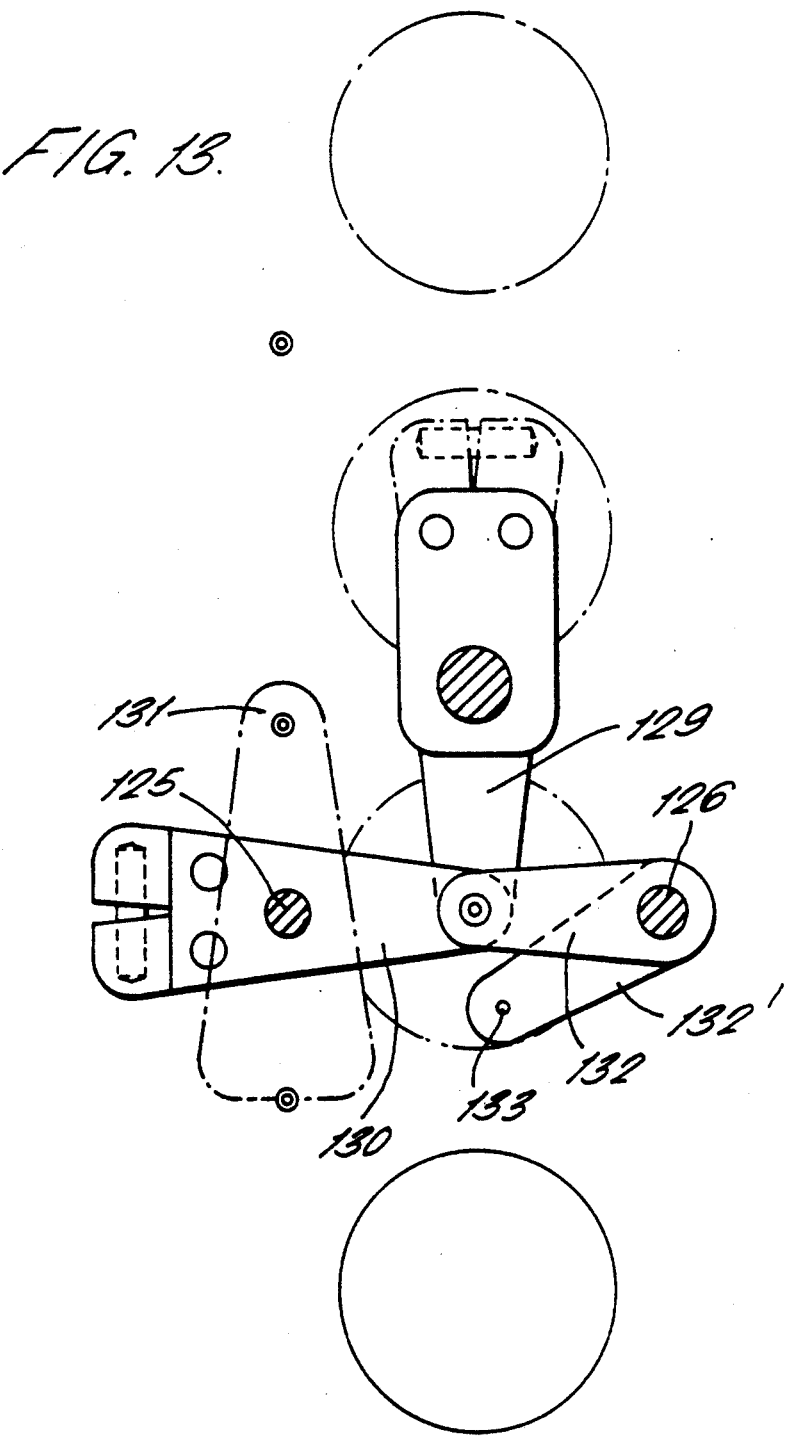

The detailed designs of the filling head 121 and the welding head 123 are no concern of the present invention and no further description will be given herein. However, further details of the pin insertion head 122 are apparent from FIGS. 12 and 13. The insertion head 122 is mounted, as are the filling head 121 and welding head 123, on a frame assembly 124 fixed within the filling chamber 2. A pair of axially movable and rotatable shafts 125 and 126 extend down through a flange 127 of the filling chamber 2 and also extend through the supporting frame 124. The two shafts 125 and 126 are disposed side by side across the width of the chamber, so that FIG. 12 is a view of the insertion head looking along the length of the chamber from the welding head 123. Supported in a fixed position from the frame 124 by means of a supporting rod 128 is a guide peg 129. This guide peg is positioned so as to provide a guiding aperture immediately over the aperture 32 of the sodium container into which the pin is to be inserted.

Attached to the lower end of the shaft 125 is a pick and place arm 130. The arm 130 has at one end 131 spring loaded "jaws" by which the arm can engage over the head of the current collector pin. In order to insert a pin in a container, the shaft 125 is first rotated to the position as shown in dotted outline in FIG. 13, with the jaws at the one end 131 of the arm 136 precisely located over the head of the current collector pin mounted in the carriage. The shaft 125 is then moved downwards axially so that the jaws mechanically engage the head of the pin, whereupon upward movement of the shaft 125 draws the pin up free of the carriage. The head 130 is then rotated, by means of the shaft 125, through 90° to bring the pin precisely over the aperture 32 in the lid of the container. Depression of the shaft 125 should then insert the pin, guided by means of the guide peg 129, into the aperture in the container.

Attached to the lower end of the other shaft 126 is a second arm 132 carrying a stripper pin 133. During the above described operation of the pick and place arm 130, the stripper pin arm is fully retracted and pivoted to the position shown in FIG. 13 at 132'. When the pick and place arm has inserted the pin into the aperture of the container, the stripper pin arm 132 is rotated by means of the shaft 126 to bring the stripper pin 133 into alignment with the head of the current collector pin held in the jaws of the pick up arm 130. The stripper pin 133 is then depressed, by axial movement of the shaft 126 so as to engage the head of the current collector pin and push the head out of the jaws of the pick and place arm 130, and firmly home to bear against the lid of the sodium container.

The stripper pin is then withdrawn from the pick and place arm and rotated away again to the position 132'.

Figure 14:
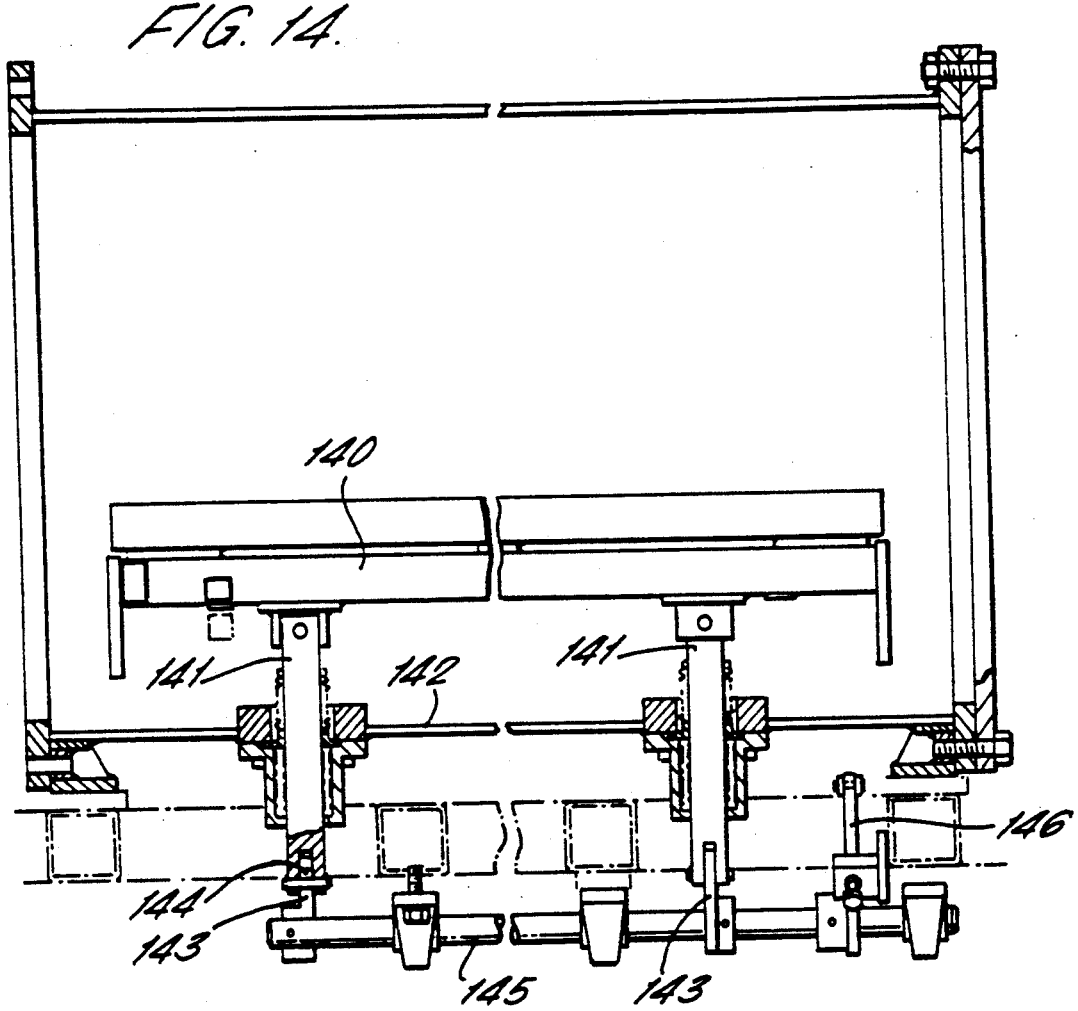
FIGS. 14 and 15 are views of the filling chamber from one side and one end respectively and particularly illustrating the mechanism for lifting the guide rail within the filling chamber to bring the sodium containers in the carriage mounted thereon into engagement with the filling, current collector locating and sealing heads in the chamber.
Figure 15:
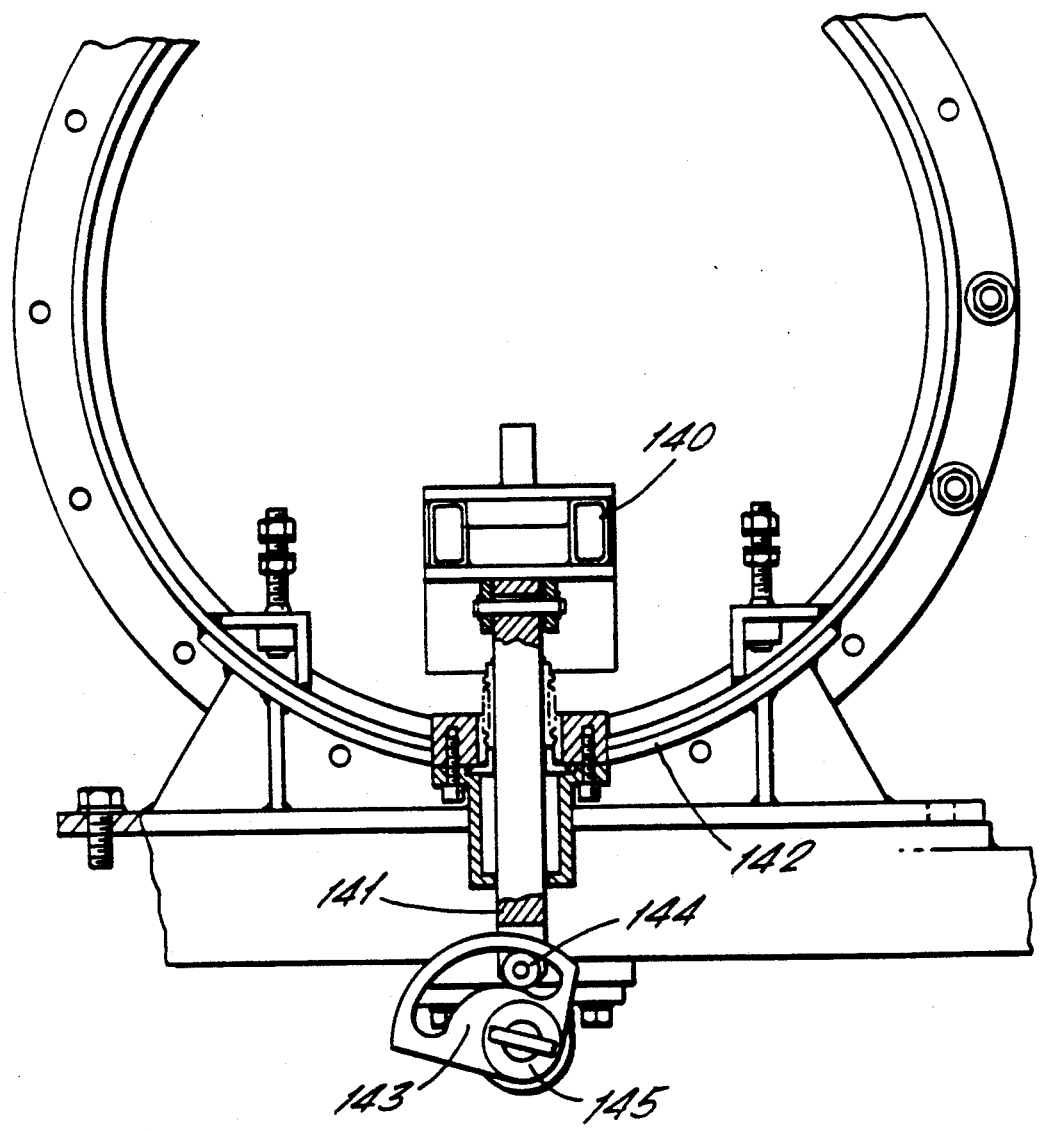

Referring again to FIG. 11, the rail 70 carrying the carriage 11 is itself mounted on an intermediate support frame 140 which is vertically movable relative to the frame 124 within the chamber 2. The intermediate support frame 140 carrying the rail 70 and the carriage 11 can be raised in its entirety by vertical axial movement of supporting shafts 141 which extend through axial seals in the outer wall 142 of the filling chamber 2. The construction of this lifting mechanism is illustrated in more detail in FIGS. 14 and 15. The two supporting shafts 141 are actuated by means of cams 143 acting on cam follower rollers 144 mounted on the lower ends of the shafts 141 extending outside the wall 142 of the pressure vessel. The cams 143 are mounted on a shaft 145 extending longitudinally underneath the cylindrical pressure vessel. Rotation of the shaft 145 by means of a pneumatic cylinder acting on a lever 146 rotates the cams 143 to raise and lower the supporting shafts 141, in turn raising and lowering the frame 140 with rail 70 carrying the carriage 11.

Referring again to FIG. 11, the raising and lowering operation of the carriage 11 enables individual sodium containers to be brought into engagement with the filling head 121, pin insertion head 122 and welding head 123 as required.

Thus, when the carriage is to be driven along the rail 70 to bring a fresh container into position under one of the heads 121, 122 and 123, the carriage is maintained in the lowered position. Once the container is correctly positioned relative to the head, the carriage is lifted, by means of the cams 143, and shafts 141, to bring the container into engagement with the head as required.

It will be appreciated that accurate positioning of each sodium container relative to the heads 121, 122 and 123 is essential. For this purpose, locating pins 150, 151 are provided in the filling chamber 2 which are axially movable to engage in the apertures 51 (FIG. 3) in the platform 43 of the carriage 11. Thus, the carriage is first driven to approximately the desired position presenting the intended container immediately beneath one of the heads 121, 122 and 123, and then the locating pins 150 and 151 are driven upwards to engage firmly in one or more of the apertures 51 of the carriage, thereby positively locating the carriage in the correct position for engagement of the selected container with the required head.

Figure 17:
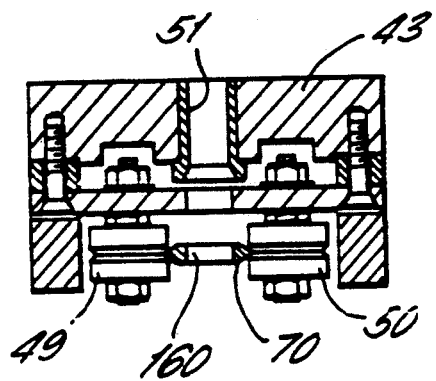
FIG. 17 is a detailed view in cross section of the carriage assembly illustrating the aperture therethrough for reception of the locating pin.

FIGS. 16 and 17 illustrate the operating mechanism for the locating pins 150, 151. Each index pin 150, 151 of FIG. 11 (only pin 150 is shown in FIGS. 16 and 17 but the description applies equally to both locating pins 150 and 151) is mounted for axial movement in a bearing 152 secured in a frame member 153 which is fixed within the chamber 2. The lower end of each pin 150 is journalled to one end of a lever arm 154 having its other end keyed to a shaft 155. The shaft 155 interconnects the levers 154 for both locating pins 150 and 151 and the shaft 155 is itself pivoted between bearings 156 fixed within the chamber 2. A further actuating lever 157 is keyed to the shaft 155 midway between the levers 154 and this lever 157 is connected via a piston rod 158 extending by means of an axial seal through the wall 142 of the chamber 2, to a pneumatic cylinder 159.

Thus, operation of the pneumatic cylinder 159 to move the piston rod 158 upwards in FIG. 17, rotates the shaft 155, thereby moving the locating pins 150, 151 axially upwards also.

FIG. 17 illustrates in cross-section the platform 43 of the carriage 11 showing in particular the aperture 51 into which one of the locating pins 150, 151 can be inserted. It should be noted that apertures 160 through the rail 70 are provided also immediately opposite each locating pin 150, 151, to allow the pin to pass through the rail before engaging in aperture 51.

An operating procedure for use with the above apparatus illustrated in the accompanying drawings will now be described referring to FIG. 18 which is a schematic diagram of the vacuum system employed for independently controlling the atmosphere in each of the three chambers of the apparatus, and constituting the separate systems illustrated at 18, 19 and 20 in FIG. 1. It should be understood that all functions of the apparatus may be controlled remotely from control unit 27 which may include a programmable controller for automating the procedure.

Firstly, a carriage such as illustrated in FIGS. 2 and 3 is loaded with sodium containers and current collector pins as described previously. Before entrance hatch 6 to the entry chamber is opened, the entry chamber is equalised to atmospheric pressure by opening valve V7 (by means of the control unit 27). When the pressure is equalised, and provided the entry door 4 to the filling chamber 2 is clamped closed, hatch release push buttons are enabled by the control unit 27 to unlock hatch 6 so it can be opened. The carriage 11 carrying the sodium containers is then introduced into the track system in the entry chamber and drawn fully into the chamber as described previously.

As mentioned before, the central container position on the carriage has a dummy sodium container fitted with temperature sensors and when the carriage has been fully drawn into the entry chamber, solenoid operated switch contacts connect this temperature sensor to the control unit 27. These switch contacts are formed, in the preferred embodiment, as a weighted arm pivoted in the entry chamber and having resilient contact fingers positioned to engage the aforementioned contact pads on the underside of the platform 43 of the carriage. When the carriage is being driven into position in the chamber the arm is held pivoted away from the contact position by means of a solenoid. When the carriage is in the correct position, the solenoid can be de-energised, allowing the weighted arm to swing down pressing the contact fingers on to the contact pads.

When the hatch 6 is subsequently closed and locked, the heaters 16 in the entry chamber are energised to begin bringing the temperature of the sodium containers up to the desired say 150° C. At the same time, valve V7 is closed and the chamber is evacuated via valve V1 and pump RP1 to a pressure of $1 \times 10^{-2}$ mbarAbs. Following evacuation, the entry chamber may be flushed with argon gas by opening valve V8 and returned to a pressure of about 1 barAbs.

The chamber is then maintained at this pressure of argon and at the desired temperature of 150° until the filling chamber is ready for the next load.

When the filling chamber is available, it will have already discharged a previous batch of filled containers to the exit chamber and will itself be at a pressure slightly in excess of 1 barAbs argon and at a temperature of 150° C.

The entry door clamps can then be released, under control from the control unit 27, provided of course that the control unit detects that the entry hatch is locked shut. Because the pressure in the filling chamber is slightly above that in the entry chamber, the closure member of the door 4 is pushed away from its seating on releasing of the door clamps and can then be slid open.

The heaters in the entry chamber are then switched off and the temperature sensor in the dummy container is disconnect by energising the solenoid to draw back the weighted arm. The drive in the entry chamber is then engaged to drive the carriage forward through the doorway engaging on the drive in the filling chamber which in turn operates to draw the carriage fully into the filling chamber. When the carriage is fully into the filling chamber 2, the entry door 4 is closed again and clamped in position. During the period whilst the carriage was waiting in the entry chamber, pump RP1 may have been called to evacuate the exit chamber, whereupon valve V1 is closed and the pressure in the entry chamber is subsequently maintained by opening valve V5 and operating pump RP2. Once the entry door 4 is closed again having delivered the carriage into the filling chamber, valve V5 is closed and the vent valve V7 is opened again to allow the entry chamber to return to atmospheric pressure for receipt of the next carriage.

In the filling chamber 2, the temperature sensor in the dummy container is connected up so that the temperature of the containers can be monitored throughout. As for the entry chamber, the contacts for the sensor are provided on a weighted arm and are released to make contact by de-energising a solenoid. However, in the filling chamber, the weighted arm is mounted so as to be slidable along a rail within the chamber, parallel to the direction of movement of the carriage. An additional finger on the weighted arm engages in a slot provided in the underside of the platform 43 of the carriage so that when the arm is released for the fingers to engage the contact pads, the additional finger engages in the slot, whereby subsequent movement of the carriage drags the arm sliding along its rail. A coiled lead connects to the arm to provide electrical lead outs and so connection can be retained to the temperature sensor continuously as the carriage is driven to and fro in the chamber.

The gas pressure in the filling chamber 2 is maintained by pump RP2 via valves V4 and V6. The drive in the entry chamber brings the carriage to present the first container to the filling head and the location pins (150, 151 from FIG. 11) are operated to correctly locate the first container. The carriage is then raised (as described with reference to FIGS. 14 and 15) so that the filling nozzle of the sodium filling head is inserted into the aperture in the lid of the first container. The filling head then injects a first quantity of liquid sodium into the first cell.

Thereafter the carriage is lowered, location pins 150 and 151 are retracted, and the drive means operates to move the carriage forward to the next container whereupon the filling procedure is repeated for the second container. When all ten containers have received a first volume of molten sodium, the control unit causes the chamber to be evacuated to $1 \times 10^{-1}$ mbarAbs using booster pump MB1 and backing pump RP1 with valve V6 closed and valves V4 and V2 open. The filling chamber is then repressurised with argon by opening valve V9 to bring the pressure back up to 1 bar.

This procedure is necessary to force the sodium within the sodium containers into the particulate aluminium filler gettering agent within the container. Sufficient sodium may be delivered so that the particulate aluminium, which may be in the form of powder or flakes, is fully covered on repressurising. The filling procedure is then repeated once more for each of the ten containers to introduce a further quantity of sodium into each container to top the container up. Generally, the further quantity will be less than that initially introduced.

On completion of the final filling operation, valve V4 and V2 are opened again and pumps MB1 and RP2 reduce the pressure in the filling chamber to 880 mbarAbs whereupon valve V4 and V2 are again closed. The carriage is then driven to bring the first container under the pin insertion head 14 (FIG. 1) and again the locating pins are actuated so as properly to locate the carriage in position. The carriage is then raised as before and the pin insertion head is operated to insert the current collector pin into the first container on the carriage.

Subsequently, the carriage is lowered again and driven forward to repeat the process on the second container in the carriage.

When the pin is being inserted in the fourth container on the carriage, the first container, with pin already inserted, will be directly beneath the welding head 15 (FIG. 1) so that welding of the first container can take place simultaneously with pin insertion on the fourth container.

The welding and pin insertion actions continue for each container in turn along the carriage, skipping the dummy container in the middle, until the pin has been inserted in the tenth container, simultaneously with welding the seventh container. Thereafter the eighth, ninth and tenth containers are in turn presented to the welding head to complete the welding and sealing of all the containers.

All ten containers should then be filled with sodium and properly sealed this having been done in an atmosphere of 880 mbarAbs argon at a temperature of 150° C. When all containers are completed, the carriage is returned to the initial position where the temperature sensor is disconnected. Then, the heaters 17 in the filling chamber 2 are switched off and when the exit chamber 3 is ready, the carriage is driven forward towards the exit door 5. When the pressure in the exit chamber is just below 880 mbarAbs, and provided the exit hatch 7 is locked shut, the exit door 5 can be unclamped and opened. Then the carriage is driven forward from the filling chamber to engage in the drive 10 in the exit chamber which draws the carriage fully into the exit chamber, whereupon the door 5 is closed and clamped again and the filling chamber 2 is immediately ready to receive a fresh carriage from the entry chamber.

In the exit chamber, the temperature sensor in the dummy container is again connected so that the temperature of the containers can be monitored as they cool. Once the containers have cooled down to a predetermined value, the pressure in the exit chamber is equalised with atmospheric by opening vent valve V10 to air. The temperature sensor in the dummy container is then disconnected and the locks on the exit hatch 7 may be released, provided the control unit detects that the exit door 5 is clamped shut. When the hatch 7 is open, the carriage with filled and sealed containers thereon can be removed for unloading and further processing.

The exit chamber hatch 7 is then shut and locked, the vent valve V10 closed and valve V3 opened so that pump RP1 can reduce the pressure in the exit chamber to $1 \times 10^{-1}$ mbarAbs. Thereafter, valve V3 is shut and valve V11 opened to flush the exit chamber with argon gas up to a pressure of 880 mbarAbs. The exit chamber is then again ready to receive a freshly processed batch of containers from the filling chamber.

We claim:

1. Apparatus for filling and sealing an alkali metal container for an alkali metal energy conversion device, comprising intercommunicating entry, filling and exit chambers, entry and exit doors which are closable to hermetically seal the filling chamber from the entry and exit chambers respectively, hermetically sealable entry and exit hatches to the entry and exit chambers respectively, interlock means to permit opening of said entry or exit hatch only when the respective said entry or exit door is closed, transfer means operable to transfer an alkali metal container to be filled and sealed successively from the entry chamber to the filling chamber and, when filled and sealed, from the filling chamber to the exit chamber, vacuum means arranged for independently controlling the atmosphere in each of the entry, filling and exit chambers to provide a respective pressure of inert gas in each of said changers, heating means arranged for independently controlling the temperatures in at least said entry and filling chambers, and filling and sealing means arranged to fill said container with molten alkali metal and seal said container in the filling chamber, the said transfer means comprising a carriage arranged to hold at least one said electrode container, and respective drive means in each of said chambers for guiding and propelling the carriage in the respective chamber, the respective drive means in adjacent communicating chambers being adapted to cooperate in supporting and propelling the carriage from one said chamber to the next through the open door between the chambers, the carriage having sufficient length in the direction of transfer to ensure full guided supporting engagement with one drive means is retained during transfer at least until the carriage engages the next drive means.

2. Apparatus as claimed in claim 1, wherein each drive means is adapted to provide cantilever support for the carriage during transfer, until engagement with a following drive means and after disengagement from a preceding drive means.

3. Apparatus as claimed in claim 1 wherein the drive means in the filling chamber includes a length of rail for engagement on opposite sides of the rail by opposed pairs of rollers on the carriage, the end of the rail adjacent the entry door being tapered to facilitate engagement of the rail between said pairs of rollers during transfer.

4. Apparatus as claimed in claim 3 wherein the opposed pairs of rollers are arranged to substantially restrict the movement of the carriage in a direction perpendicular to the axis of the drive means.

5. Apparatus as claimed in claim 1 wherein the carriage is adapted to hold said electrode container at a position on the carriage and the drive means in the filling chamber is arranged to convey the electrode container on the carriage between respective filling and sealing stations within the filling chamber, the apparatus including inter-engagable locating means on the carriage and in the filling chamber actuatable to locate the electrode container accurately relative to the filling and sealing means in the filling and sealing stations respectively.

6. Apparatus as claimed claim 5, wherein said interengagable locating means comprise a locating pin mounted either on the carriage or in the filling chamber to be longitudinally movable on actuation to engage in a corresponding aperture in the filling chamber or in the carriage respectively.

7. Apparatus as claimed in claim 6, wherein at least one of the locating pin and said aperture is tapered to assist positive engagement between the pin and aperture.

8. Apparatus as claimed in claim 6 wherein there is a single said locating pin and a respective said corresponding aperture for each of the filling and sealing stations.

9. Apparatus as claimed in claim 6 wherein there are at least two locating pins mounted in the filling chamber arranged for engaging successively in a common aperture in the carriage to locate the electrode container firstly at the filling stations and secondly at the sealing station.

10. Apparatus as claimed in claim 1, and including guide means in the filling chamber for supporting and guiding the electrode container between respective filling and sealing stations in the filling chamber, and lifting means actuatable to lift the guide means and the electrode chamber supported thereon into operative engagement with the filling and sealing means.

11. Method of filling alkali metal electrode containers, for alkali metal energy conversion devices, each container holding solid material, with molten alkali metal having a large wetting angle to the solid material, comprising the steps of filling said container with gas which is inert to the alkali metal; pumping a first quantity of the molten alkali metal into the container; reducing the pressure of said gas in the container and then raising the pressure of the gas to increase the wetting of the solid material by the molten alkali metal.

12. Method as claimed in claim 11 wherein the container is initially filled with said gas at a particular pressure, and after said pressure reducing step, the pressure is raised again to said particular pressure.

13. Method as claimed in claim 11 comprising the further step of pumping a second quantity of alkali metal into the container after the gas pressure is raised again.

14. Method as claimed in claim 11 wherein the solid material is a gettering agent.

15. Method as claimed in claim 14 wherein the gettering agent is aluminium powder or flakes.

16. Method as claimed in claim 11 wherein the first quantity of alkali metal is sufficient to fully cover the solid material, on raising the pressure of the gas.

17. Method as claimed in claim 13 wherein the first quantity of alkali metal exceeds the second quantity of alkali metal.

18. Method as claimed in claims 11 wherein the container is positioned inside a pressure chamber filled with said gas.

19. Method as claimed in claim 18 wherein varying the pressure of the gas in the container is effected by varying the pressure of the gas in the pressure chamber.

* * * * *